and rubber crosslinked product," XP002809499, Chemical Abstracts

(12) United States Patent
Bando

(10) Patent No.: US 12,466,907 B2
(45) Date of Patent: *Nov. 11, 2025

(54) ACRYLIC RUBBER COMPOSITION AND RUBBER CROSSLINKED PRODUCT

(71) Applicant: ZEON CORPORATION, Tokyo (JP)

(72) Inventor: Fumiaki Bando, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 17/623,024

(22) PCT Filed: Jun. 24, 2020

(86) PCT No.: PCT/JP2020/024913
§ 371 (c)(1),
(2) Date: Dec. 27, 2021

(87) PCT Pub. No.: WO2020/262496
PCT Pub. Date: Dec. 30, 2020

(65) Prior Publication Data
US 2022/0315684 A1    Oct. 6, 2022

(30) Foreign Application Priority Data
Jun. 28, 2019    (JP) ................. 2019-122128

(51) Int. Cl.
| | |
|---|---|
| *C08F 220/14* | (2006.01) |
| *C08F 220/18* | (2006.01) |
| *C08F 222/04* | (2006.01) |
| *C08K 5/00* | (2006.01) |
| *C08K 5/3415* | (2006.01) |
| *C08K 5/41* | (2006.01) |
| *C08K 5/46* | (2006.01) |

(52) U.S. Cl.
CPC ...... *C08F 220/1804* (2020.02); *C08F 220/14* (2013.01); *C08F 222/04* (2013.01); *C08K 5/005* (2013.01); *C08K 5/3415* (2013.01); *C08K 5/41* (2013.01); *C08K 5/46* (2013.01)

(58) Field of Classification Search
CPC .............. C08F 220/1804; C08F 220/14; C08F 222/16; C08F 220/1802; C08F 220/281; C08F 220/1806; C08L 2201/08; C08K 5/005; C08K 5/3415; C08K 5/41; C08K 5/46; C08K 5/3417; C08K 5/18; C08K 5/3725; C08K 3/1006
See application file for complete search history.

(56) References Cited

U.S. PATENT DOCUMENTS

| | | | | |
|---|---|---|---|---|
| 2010/0323141 | A1* | 12/2010 | Kawasaki | C08F 220/1802 524/561 |
| 2012/0101196 | A1* | 4/2012 | Sakamoto | C08K 5/3417 548/476 |
| 2012/0302674 | A1* | 11/2012 | Ogawa | C08K 5/3417 524/89 |
| 2012/0302675 | A1 | 11/2012 | Sakamoto et al. | |
| 2015/0087754 | A1 | 3/2015 | Sakamoto et al. | |
| 2017/0121439 | A1 | 5/2017 | Emori et al. | |
| 2020/0002507 | A1* | 1/2020 | Sugawara | C08K 5/46 |

FOREIGN PATENT DOCUMENTS

| | | | | |
|---|---|---|---|---|
| JP | 5732673 | B2 | 6/2015 | |
| JP | 2015-137322 | A1 | 7/2015 | |
| JP | 2015-137323 | A1 | 7/2015 | |
| JP | 5811845 | B2 * | 11/2015 | ........... C07C 317/36 |
| WO | 2011/002038 | A1 | 1/2011 | |
| WO | 2011/058918 | A1 | 5/2011 | |
| WO | 2011/093443 | A1 | 8/2011 | |
| WO | 2016/002936 | A1 | 1/2016 | |
| WO | WO-2018159459 | A1 * | 9/2018 | ........ C07D 207/404 |

OTHER PUBLICATIONS

The machine tranlsation into English of JP 5811845 B2 (Year: 2015).*
Aug. 11, 2020 International Search Report issued in International Patent Application No. PCT/JP2020/024913.
Dec. 28, 2021 International Preliminary Report on Patentability issued in Patent Application No. PCT/JP2020/024913.
Jun. 22, 2023 European Search Report issued in European Patent Application No. 20831190.2.
Manabu Sugiyama et al., "Crosslinkable acrylic rubber composition and rubber crosslinked product," XP002809499, Chemical Abstracts Service, Jul. 30, 2015.
Tomonori Ogawa et al., "Acrylic rubber compositions and crosslinked rubber products therewith," XP002809500, Chemical Abstracts Service, Jul. 30, 2015.

* cited by examiner

*Primary Examiner* — Karuna P Reddy
(74) *Attorney, Agent, or Firm* — Oliff PLC

(57) ABSTRACT

An acrylic rubber composition includes an acrylic rubber and a specific antioxidant, wherein the acrylic rubber includes 15 to 55% by weight of methacrylic acid alkyl ester monomer units (a), 44.5 to 84.5% by weight of acrylic acid ester monomer units (b), and 0.5 to 4% by weight of carboxyl group-containing monomer units (c), and the content of the antioxidant is 0.1 to 5 parts by weight relative to 100 parts by weight of the acrylic rubber.

7 Claims, No Drawings

ACRYLIC RUBBER COMPOSITION AND RUBBER CROSSLINKED PRODUCT

TECHNICAL FIELD

The present invention relates to an acrylic rubber composition and a cross-linked rubber prepared by cross-linking the acrylic rubber composition.

BACKGROUND ART

In the automobile-related field, acrylic rubbers are widely used in rubber members such as hoses, seals, and gaskets because of their high heat resistance, high cold resistance, high oil resistance, and the like.

On the other hand, such automobile rubber members, particularly rubber members inside engine rooms are required to have further improved heat resistance due to superchargers (turbochargers) having higher performance accompanied by higher output of engines, recent severer regulations on exhaust gas, and the like.

Traditionally, compounding of an antioxidant with the acrylic rubber has been examined as a method for improving the heat resistance of rubber members. For example, Patent Document 1 discloses an acrylic rubber composition comprising an acrylic rubber and a novel condensed heterocyclic compound as an antioxidant. According to Patent Document 1, such an acrylic rubber composition can ensure a cross-linked rubber which has high heat resistance and can suppress a reduction in physical properties such as elongation even if exposed to a high temperature condition for a long time, in particular. However, further improvement has been desired to sufficiently satisfy the recent demand for the heat resistance of the acrylic rubber. In addition, Patent Document 1 does not disclose the cold resistance of the resulting cross-linked rubber at all.

RELATED ART

Patent Document

Patent Document 1: International Publication No. WO 2011/093443

SUMMARY OF THE INVENTION

Problem to be Solved by the Invention

The present invention has been made in consideration of such circumstances. An object of the present invention is to provide an acrylic rubber composition which demonstrates high cold resistance and can ensure a cross-linked rubber having significantly improved heat resistance.

Means for Solving the Problem

The present inventor, who has conducted extensive research to achieve the above object, has found that heat resistance improving effect, which is attributed to use of a specific antioxidant, can be dramatically enhanced by use of an acrylic rubber having a specific monomer composition in combination with the specific antioxidant to solve the problem described above, and has completed the present invention.

In other words, the present invention provides an acrylic rubber composition comprising an acrylic rubber and an antioxidant, wherein the acrylic rubber comprises 15 to 55% by weight of methacrylic acid alkyl ester monomer units (a), 44.5 to 84.5% by weight of acrylic acid ester monomer units (b), and 0.5 to 4% by weight of carboxyl group-containing monomer units (c), the antioxidant is at least one of compounds represented by General Formulae (1) to (4) below, and the content of the antioxidant is 0.1 to 5 parts by weight relative to 100 parts by weight of the acrylic rubber:

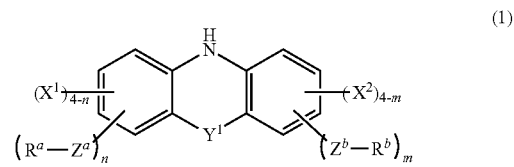

(1)

where, in General Formula (1), $Y^1$ represents a chemical single bond, $-S(=O)-$, or $-SO_2-$; $R^a$ and $R^b$ each independently represent a $C_1$ to $C_{30}$ organic group which may have a substituent; $Z^a$ and $Z^b$ each independently represent a chemical single bond or $-SO_2-$; $X^1$ and $X^2$ each independently represent a hydrogen atom, a halogen atom, a $C_1$ to $C_{10}$ alkyl group which may have a substituent, a cyano group, a nitro group, $-OR^1$, $-O-C(=O)-R^1$, $-C(=O)-OR^1$, $-O-C(=O)-OR^1$, $-NR^2(R^3)$, $-NR^2-C(=O)-R^1$, $-C(=O)-NR^2(R^3)$, or $-O-C(=O)-NR^2(R^3)$, where $R^1$, $R^2$, and $R^3$ each independently represent a hydrogen atom or a $C_1$ to $C_{20}$ organic group which may have a substituent; "n" and "m" each independently represent an integer of 0 to 2, and one of "n" and "m" is not 0; and when "n" and/or "m" is 2, two Ras and two R's each may be the same or different;

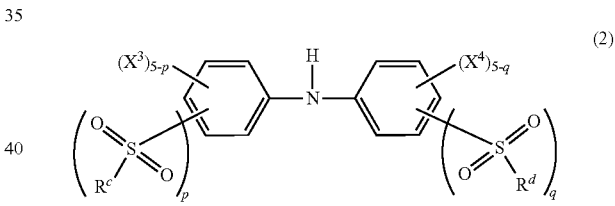

(2)

where, in General Formula (2), Re and $R^d$ each independently represent a $C_1$ to $C_{30}$ organic group which may have a substituent; $X^3$ and $X^4$ each independently represent a hydrogen atom, a halogen atom, a $C_1$ to $C_{10}$ alkyl group which may have a substituent, a cyano group, a nitro group, $-OR^4$, $-O-C(=O)-R^4$, $-C(=O)-OR^4$, $-O-C(=O)-OR^4$, $-NR^5(R^6)$, $-NR^5-C(=O)-R^4$, $-C(=O)-NR^5(R^6)$, or $-O-C(=O)-NR^5(R^6)$ where $R^4$, $R^5$, and $R^6$ each independently represent a hydrogen atom or a $C_1$ to $C_{20}$ organic group which may have a substituent; and "p" and "q" each independently represent 0 or 1, and at least one of "p" and "q" is 1;

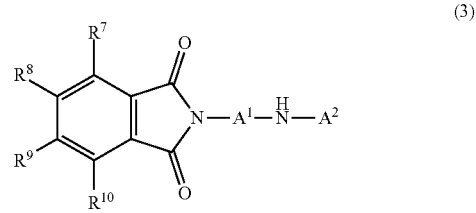

(3)

where, in General Formula (3), $A^1$ and $A^2$ each independently represent an a aromatic group which may have a $C_1$ to $C_{30}$ substituent; $R^7$, $R^9$, and $R^{10}$ each independently represent a hydrogen atom, a halogen atom, a $C_1$ to $C_{10}$ alkyl group which may have a substituent, a cyano group, a nitro group, $-OR^{1a}$, $-O-C(=O)-R^{1a}$, $-C(=O)-OR^{1a}$, $-O-C(=O)-OR^{1a}$, $-NR^{1b}-C(=O)-R^{1a}$, $-C(=O)-NR^{1a}R^{1c}$, or $-O-C(=O)-NR^{1a}R^{1c}$; $R^{1a}$ and $R^{1c}$ each independently represent a hydrogen atom or a $C_1$ to $C_{30}$ organic group which may have a substituent; each $R_{1b}$ independently represents a hydrogen atom or a $C_1$ to $C_6$ alkyl group; the $C_1$ to $C_{30}$ organic group forming $R^{1a}$ and $R^{1c}$ may include at least one linking group selected from the group consisting of $-O-$, $-S-$, $-O-C(=O)-$, $-C(=O)-O-$, $-O-C(=O)-O-$, $-NR^{1d}-C(=O)-$, $-C(=O)-NR^{1d}-$, $-NR^{1d}-$, and $-C(=O)-$, except for the case where a linking group consisting of two or more adjacent $-O-$ or $-S-$ groups is included; each $R^{1d}$ independently represents a hydrogen atom or a $C_1$ to $C_6$ alkyl group; $R^8$ represents a hydrogen atom, a halogen atom, a $C_1$ to $C_{10}$ alkyl group which may have a substituent, a cyano group, a nitro group, $-O-C(=O)-R^{1e}$, $-C(=O)-OR^{1e}$, $-NR^{1b}-C(=O)-R^{1e}$, $-C(=O)-NR^{1e}R^{1f}$, or $-O-C(=O)-NR^{1e}R^{1f}$; $R^{1e}$ and $R^{1f}$ each independently represent a $C_1$ to $C_{30}$ organic group which may have a substituent; the $C_1$ to $C_{30}$ organic group forming $R^{1e}$ and $R^{1f}$ may include at least one linking group selected from the group consisting of $-O-$, $-S-$, $-O-C(=O)-$, $-C(=O)-O-$, $-O-C(=O)-O-$, $-NR^{1d}-C(=O)-$, $-C(=O)-NR^{1d}-$, $-NR^{1d}-$, and $-C(=O)-$, except for the case where a linking group consisting of two or more adjacent $-O-$ or $-S-$ groups is included; and RID 1b and Rid each independently represent a hydrogen atom or a $C_1$ to $C_6$ alkyl group; and

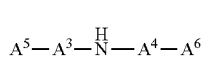

(4)

where, in General Formula (4), $A^3$ and $A^4$ each independently represent a $C_6$ to $C_{18}$ arylene group which may have a substituent, and $A^5$ and $A^6$ each independently represent an organic group having a cyclic imide structure which may have a substituent.

In the acrylic rubber composition according to the present invention, the content of the antioxidant is preferably 0.3 to 3.5 parts by weight relative to 100 parts by weight of the acrylic rubber.

In the acrylic rubber composition according to the present invention, as the methacrylic acid alkyl ester monomer units (a), the acrylic rubber preferably contains at least one selected from the group consisting of methyl methacrylate units, ethyl methacrylate units, n-propyl methacrylate units, n-butyl methacrylate units, n-pentyl methacrylate units, and n-hexyl methacrylate units.

In the acrylic rubber composition according to the present invention, as the acrylic acid ester monomer units (b), the acrylic rubber preferably contains at least one selected from the group consisting of methyl acrylate units, ethyl acrylate units, n-butyl acrylate units, and 2-methoxyethyl acrylate units.

In the acrylic rubber composition according to the present invention, the compound represented by General Formula (1) is preferably a compound represented by General Formula (9):

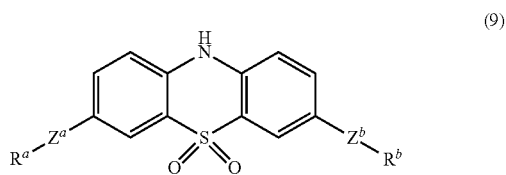

where, in General Formula (9), $R^a$ and $R^b$ each independently represent a $C_1$ to $C_{30}$ organic group which may have a substituent; and $Z^a$ and $Z^b$ each independently represent a chemical single bond or $-SO_2-$.

In the acrylic rubber composition according to the present invention, the compound represented by General Formula (2) is preferably a compound represented by General Formula (13):

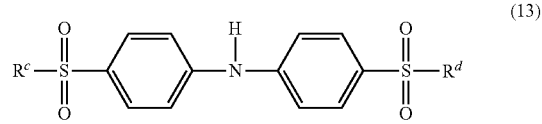

where, in General Formula (13), $R^c$ and $R^d$ each independently represent a $C_1$ to $C_{30}$ organic group which may have a substituent.

In the acrylic rubber composition according to the present invention, the compound represented by General Formula (3) is preferably a compound represented by General Formula (14):

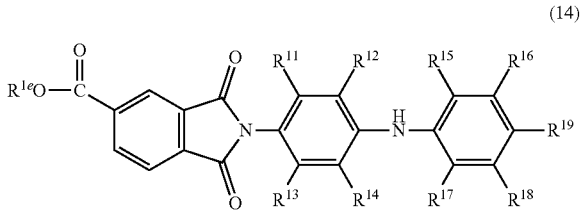

where, in General Formula (14), $R^{11}$ to $R^{19}$ each independently represent a hydrogen atom, a $C_1$ to $C_{10}$ alkyl group, a halogen-substituted $C_1$ to $C_{10}$ alkyl group, a halogen atom, a cyano group, or a nitro group; $R^{1e}$ represents a $C_1$ to $C_{30}$ organic group which may have a substituent; the $C_1$ to $C_{30}$ organic group forming $R^{1e}$ may include at least one linking group selected from the group consisting of $-O-$, $-S-$, $-O-C(=O)-$, $-C(=O)-O-$, $-O-C(=O)-O-$, $-NR^{1d}-C(=O)-$, $-C(=O)-NR^{1d}-$, $-NR^{1d}-$, and $-C(=O)-$, except for the case where a linking group consisting of two or more adjacent $-O-$ or $-S-$ groups is included; and each $R^{1d}$ independently represents a hydrogen atom or a $C_1$ to $C_6$ alkyl group.

In the acrylic rubber composition according to the present invention, the compound represented by General Formula (4) is preferably a compound represented by General Formula (24):

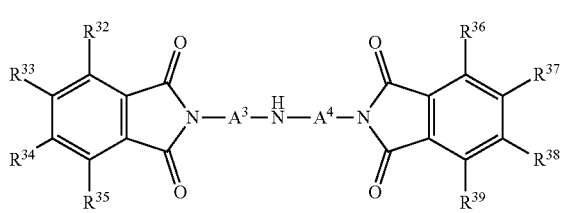

(24)

where, in General Formula (24), $R^3$ to $R^9$ each independently represent a hydrogen atom, a $C_1$ to $C_{30}$ alkyl group, a $C_1$ to $C_{30}$ alkenyl group, $-OR^{44}$, $-O-C(=O)-R^{44}$, $-C(=O)-OR^{44}$, $-C(=O)-NR^{44}(R^{45})$, $-NR^{44}-C(=O)-R^{45}$, $-CN$, $-SR^{44}$, $-S-(=O)-R^{44}$, or $-S(=O)_2-R^{44}$, and $R^{44}$ and $R^{45}$ each independently represent a $C_1$ to $C_{30}$ alkyl group, a $C_1$ to $C_{30}$ alkenyl group, or a $C_6$ to $C_{12}$ aromatic group; and $A^3$ and $A^4$ each independently represent a $C_6$ to $C_{18}$ arylene group which may have a substituent.

Preferably, the acrylic rubber composition according to the present invention further comprises 0.05 to 20 parts by weight of a cross-linking agent relative to 100 parts by weight of the acrylic rubber.

The present invention also provides a cross-linked rubber prepared by cross-linking the acrylic rubber composition.

The cross-linked rubber according to the present invention is preferably a hose material or a sealing material.

Advantageous Effects

The present invention can provide an acrylic rubber composition which can ensure an excellent cross-linked rubber having a good balance between heat resistance and cold resistance, and a cross-linked rubber prepared by cross-linking the acrylic rubber composition.

DESCRIPTION OF EMBODIMENTS

<Acrylic Rubber Composition>

The acrylic rubber composition according to the present invention comprises an acrylic rubber and an antioxidant, wherein the acrylic rubber comprises 15 to 55% by weight of methacrylic acid alkyl ester monomer units (a), 44.5 to 84.5% by weight of acrylic acid ester monomer units (b), and 0.5 to 4% by weight of carboxyl group-containing monomer units (c), the antioxidant is at least one of compounds represented by General Formulae (1) to (4) described later, and the content of the antioxidant is 0.1 to 5 parts by weight relative to 100 parts by weight of the acrylic rubber.

(Acrylic Rubber)

The acrylic rubber used in the present invention comprises 15 to 55% by weight of methacrylic acid alkyl ester monomer units (a), 44.5 to 84.5% by weight of acrylic acid ester monomer units (b), and 0.5 to 4% by weight of carboxyl group-containing monomer units (c).

Although not particularly limited, methacrylic acid alkyl ester monomers which form the methacrylic acid alkyl ester monomer units (a) are preferably esters of $C_1$ to $C_8$ alkanols with methacrylic acid. Specifically, examples thereof include methyl methacrylate, ethyl methacrylate, n-propyl methacrylate, isopropyl methacrylate, n-butyl methacrylate, isobutyl methacrylate, n-pentyl methacrylate, isopentyl methacrylate, n-hexyl methacrylate, n-octyl methacrylate, 2-ethylhexyl methacrylate, cyclohexyl methacrylate, and the like. Among these, preferred are linear alkyl esters of methacrylic acid and methacrylic acid alkyl esters having a $C_1$ to $C_7$ alkyl group, more preferred are methyl methacrylate, ethyl methacrylate, n-propyl methacrylate, n-butyl methacrylate, n-pentyl methacrylate, and n-hexyl methacrylate, and particularly preferred are methyl methacrylate, ethyl methacrylate, and n-butyl methacrylate. These can be used alone or in combination.

In other words, as the methacrylic acid alkyl ester monomer units (a), the acrylic rubber used in the present invention preferably contains at least one selected from the group consisting of methyl methacrylate units, ethyl methacrylate units, n-propyl methacrylate units, n-butyl methacrylate units, n-pentyl methacrylate units, and n-hexyl methacrylate units, and more preferably contains at least one selected from the group consisting of methyl methacrylate units, ethyl methacrylate units, n-butyl methacrylate units, and n-hexyl methacrylate units. When the acrylic rubber composition comprising an acrylic rubber containing such monomer units is formed into a cross-linked rubber, the resulting cross-linked rubber can have particularly high heat resistance.

The content of the methacrylic acid alkyl ester monomer units (a) in the acrylic rubber used in the present invention is 15 to 55% by weight, preferably 16 to 49.9% by weight, more preferably 18 to 44.8% by weight, still more preferably 20 to 39.5% by weight. A significantly small content of the methacrylic acid alkyl ester monomer units (a) results in a cross-linked rubber having reduced heat resistance. In contrast, a significantly large content of the methacrylic acid alkyl ester monomer units (a) results in a cross-linked rubber having reduced cold resistance.

Examples of acrylic acid ester monomers forming the acrylic acid ester monomer units (b) include, but should not be limited to, acrylic acid alkyl ester monomers, acrylic acid alkoxyalkyl ester monomers, and the like.

Although not particularly limited, preferred acrylic acid alkyl ester monomers are esters of $C_1$ to $C_8$ alkanols with acrylic acid. Specifically, examples thereof include methyl acrylate, ethyl acrylate, n-propyl acrylate, isopropyl acrylate, n-butyl acrylate, isobutyl acrylate, n-hexyl acrylate, 2-ethylhexyl acrylate, cyclohexyl acrylate, and the like. Among these, preferred are methyl acrylate, ethyl acrylate, and n-butyl acrylate, more preferred are ethyl acrylate and n-butyl acrylate, and particularly preferred is n-butyl acrylate. These can be used alone or in combination.

Although not particularly limited, preferred acrylic acid alkoxyalkyl ester monomers are esters of $C_2$ to $C_8$ alkoxyalkyl alcohols with acrylic acid. Specifically, examples thereof include methoxymethyl acrylate, ethoxymethyl acrylate, 2-methoxyethyl acrylate, 2-ethoxyethyl acrylate, 2-propoxyethyl acrylate, 2-butoxyethyl acrylate, 3-methoxypropyl acrylate, 4-methoxybutyl acrylate, and the like. Among these, preferred are 2-ethoxyethyl acrylate and 2-methoxyethyl acrylate, and particularly preferred is 2-methoxyethyl acrylate. These can be used alone or in combination.

As the acrylic acid ester monomer units (b), the acrylic rubber used in the present invention preferably contains at least one selected from the group consisting of methyl acrylate units, ethyl acrylate units, n-butyl acrylate units, and 2-methoxyethyl acrylate units, and more preferably contains at least one selected from the group consisting of ethyl acrylate units, n-butyl acrylate units, and 2-methoxyethyl acrylate units. When the acrylic rubber composition comprising an acrylic rubber containing such monomer units is formed into a cross-linked rubber, the resulting cross-linked rubber can have particularly high heat resistance.

The content of the acrylic acid ester monomer units (b) in the acrylic rubber used in the present invention is 44.5 to 84.5% by weight, preferably 49.5 to 83.4% by weight, more preferably 54.5 to 81.3% by weight, still more preferably 59.5 to 79.0% by weight. A significantly small content of the acrylic acid ester monomer units (b) results in a cross-linked rubber having reduced cold resistance. In contrast, a significantly large content of the acrylic acid ester monomer units (b) results in a cross-linked rubber having reduced heat resistance.

The carboxyl group-containing monomer which forms the carboxyl group-containing monomer units (c) is not particularly limited, and $\alpha,\beta$-ethylenically unsaturated carboxylic acids can be suitably used, for example. Examples of the $\alpha,\beta$-ethylenically unsaturated carboxylic acids include $C_3$ to $C_{12}$ $\alpha,\beta$-ethylenically unsaturated monocarboxylic acids, $C_4$ to $C_{12}$ $\alpha,\beta$-ethylenically unsaturated dicarboxylic acids, monoesters of $C_4$ to $C_{12}$ $\alpha,\beta$-ethylenically unsaturated dicarboxylic acids with $C_1$ to $C_8$ alkanols, and the like. An acrylic rubber which contains $\alpha,\beta$-ethylenically unsaturated carboxylic acid monomer units is preferred because such an acrylic rubber can have carboxyl groups as cross-linking points, thereby further enhancing the compression set resistance of the resulting cross-linked rubber.

Examples of the $C_3$ to $C_1$ $\alpha,\beta$-ethylenically unsaturated monocarboxylic acid include acrylic acid, methacrylic acid, $\alpha$-ethylacrylic acid, crotonic acid, cinnamic acid, and the like.

Examples of the $C_4$ to $C_1$ $\alpha,\beta$-ethylenically unsaturated dicarboxylic acids include butenedioic acids such as fumaric acid and maleic acid; itaconic acid; citraconic acid; chloromaleic acid; and the like.

Examples of the monoesters of $C_4$ to $C_{12}$ $\alpha,\beta$-ethylenically unsaturated dicarboxylic acids with $C_1$ to $C_8$ alkanols include mono-alkyl chain esters of butenedioic acids, such as monomethyl fumarate, monoethyl fumarate, mono-n-butyl fumarate, monomethyl maleate, monoethyl maleate, and mono-n-butyl maleate; butenedioic acid monoesters having an alicyclic structure, such as monocyclopentyl fumarate, monocyclohexyl fumarate, monocyclohexenyl fumarate, monocyclopentyl maleate, monocyclohexyl maleate, and monocyclohexenyl maleate; itaconic acid monoesters such as monomethyl itaconate, monoethyl itaconate, mono-n-butyl itaconate, and monocyclohexyl itaconate; and the like.

The carboxyl group-containing monomer is preferably an $\alpha,\beta$-ethylenically unsaturated carboxylic acid, more preferably a monoester of a $C_4$ to $C_1$ $\alpha,\beta$-ethylenically unsaturated dicarboxylic acid with a $C_1$ to $C_8$ alkanol, particularly preferably a mono-alkyl chain ester of butenedioic acid or a butenedioic acid monoester having an alicyclic structure. Preferred examples thereof specifically include mono-n-butyl fumarate, mono-n-butyl maleate, monocyclohexyl fumarate, monocyclohexyl maleate, and the like. Particularly preferred is mono-n-butyl maleate. These $\alpha,\beta$-ethylenically unsaturated carboxylic acid monomers can be used alone or in combination. Among the monomers listed above, the dicarboxylic acids include anhydrides thereof.

The content of the carboxyl group-containing monomer units (c) is 0.5 to 4% by weight, preferably 0.6 to 3.5% by weight, more preferably 0.7 to 3.0% by weight. A significantly small content of the carboxyl group-containing monomer units (c) results in a cross-linked rubber having reduced compression set resistance. In contrast, a significantly large content of the carboxyl group-containing monomer units (c) results in a cross-linked rubber having reduced heat resistance.

In addition to the methacrylic acid alkyl ester monomer units (a), the acrylic acid ester monomer units (b), and the carboxyl group-containing monomer units (c), the acrylic rubber used in the present invention may have other monomer units copolymerizable therewith as needed.

Examples of such other copolymerizable monomers include, but should not be limited to, methacrylic acid alkoxyalkyl ester monomers, cross-linkable monomers other than carboxyl group-containing monomers, aromatic vinyl monomers, $\alpha,\beta$-ethylenically unsaturated nitrile monomers, monomers having two or more (meth)acryloyloxy groups (hereinafter, referred to as "polyfunctional (meth)acrylic monomers" in some cases), olefin monomers, $\alpha,\beta$-ethylenically unsaturated dicarboxylic acid diester monomers, vinyl ester compounds, vinyl ether compounds, and the like.

Although not particularly limited, preferred methacrylic acid alkoxyalkyl ester monomers are esters of $C_2$ to $C_8$ alkoxyalkyl alcohols with methacrylic acid. Specifically, examples thereof include methoxymethyl methacrylate, ethoxymethyl methacrylate, 2-methoxyethyl methacrylate, 2-ethoxyethyl methacrylate, 2-propoxyethyl methacrylate, 2-butoxyethyl methacrylate, 3-methoxypropyl methacrylate, 4-methoxybutyl methacrylate, and the like. Among these, preferred are 2-ethoxyethyl methacrylate and 2-methoxyethyl methacrylate. These can be used alone or in combination.

Examples of the cross-linkable monomers other than carboxyl group-containing monomers include, but should not be limited to, monomers having an epoxy group; monomers having a halogen atom; diene monomers; and the like. These cross-linkable monomers can be used alone or in combination.

Examples of the monomers having an epoxy group include, but should not be limited to, epoxy group-containing (meth)acrylic acid esters, epoxy group-containing ethers, and the like.

Specific examples of the epoxy group-containing (meth)acrylic acid esters include glycidyl (meth)acrylate, and the like.

Specific examples of the epoxy group-containing ethers include allyl glycidyl ether, vinyl glycidyl ether, and the like. Among these, preferred are glycidyl methacrylate and allyl glycidyl ether. These monomers having an epoxy group can be used alone or in combination.

Examples of the monomers having a halogen atom include, but should not be limited to, unsaturated alcohol esters of halogen-containing saturated carboxylic acids, haloalkyl (meth)acrylates, haloacyloxyalkyl (meth)acrylates, (haloacetylcarbamoyloxy)alkyl (meth)acrylates, halogen-containing unsaturated ethers, halogen-containing unsaturated ketones, halomethyl group-containing aromatic vinyl compounds, halogen-containing unsaturated amides, haloacetyl group-containing unsaturated monomers, halogenated vinyl compounds, and the like.

Specific examples of the unsaturated alcohol esters of halogen-containing saturated carboxylic acids include vinyl chloroacetate, vinyl 2-chloropropionate, allyl chloroacetate, and the like.

Specific examples of the haloalkyl (meth)acrylates include chloromethyl (meth)acrylate, 1-chloroethyl (meth)acrylate, 2-chloroethyl (meth)acrylate, 1,2-dichloroethyl (meth)acrylate, 2-chloropropyl (meth)acrylate, 3-chloropropyl (meth)acrylate, 2,3-dichloropropyl (meth)acrylate, and the like.

Specific examples of the haloacyloxyalkyl (meth)acrylates include 2-(chloroacetoxy)ethyl (meth)acrylate, 2-(chloroacetoxy)propyl (meth)acrylate, 3-(chloroacetoxy)propyl (meth)acrylate, 3-(hydroxychloroacetoxy)propyl (meth)acrylate, and the like.

Specific examples of the (haloacetylcarbamoyloxy)alkyl (meth)acrylates include 2-(chloroacetylcarbamoyloxy)ethyl (meth)acrylate, 3-(chloroacetylcarbamoyloxy)propyl (meth)acrylate, and the like.

Specific examples of the halogen-containing unsaturated ethers include chloromethyl vinyl ether, 2-chloroethyl vinyl ether, 3-chloropropyl vinyl ether, 2-chloroethyl allyl ether, 3-chloropropyl allyl ether, and the like.

Specific examples of the halogen-containing unsaturated ketones include 2-chloroethyl vinyl ketone, 3-chloropropyl vinyl ketone, 2-chloroethyl allyl ketone, and the like.

Specific examples of the halomethyl group-containing aromatic vinyl compounds include p-chloromethylstyrene, m-chloromethylstyrene, o-chloromethylstyrene, p-chloromethyl-α-methylstyrene, and the like.

Specific examples of the halogen-containing unsaturated amides include N-chloromethyl-(meth)acrylamide, and the like.

Specific examples of the haloacetyl group-containing unsaturated monomers include 3-(hydroxychloroacetoxy)propyl allyl ether, p-vinylbenzyl chloroacetic acid esters, and the like.

Specific examples of the halogenated vinyl compounds include vinyl chloride, vinylidene chloride, allyl chlorides, and the like.

Among these, preferred are unsaturated alcohol esters of halogen-containing saturated carboxylic acids and halogen-containing unsaturated ethers, more preferred are vinyl chloroacetate and 2-chloroethyl vinyl ether, and still more preferred is vinyl chloroacetate. These monomers having a halogen atom can be used alone or in combination.

Examples of the diene monomers include conjugated diene monomers and non-conjugated diene monomers.

Specific examples of the conjugated diene monomers include 1,3-butadiene, isoprene, piperylene, and the like.

Specific examples of the non-conjugated diene monomers include ethylidene norbornene, dicyclopentadiene, dicyclopentadienyl (meth)acrylate, 2-dicyclopentadienylethyl (meth)acrylate, and the like.

Besides the monomers having an epoxy group, the monomers having a halogen atom, and the diene monomers listed above, another cross-linkable monomer other than carboxyl group-containing monomers can also be used as needed.

These monomers having an epoxy group, monomers having a halogen atom, and diene monomers listed above can be used alone or in combination.

Specific examples of the aromatic vinyl monomers include styrene, α-methylstyrene, divinylbenzene, and the like.

Specific examples of the α,β-ethylenically unsaturated nitrile monomers include acrylonitrile, methacrylonitrile, and the like.

Specific examples of the polyfunctional (meth)acrylic monomers include ethylene glycol di(meth)acrylate, propylene glycol di(meth)acrylate, and the like.

Specific examples of the olefin monomers include ethylene, propylene, 1-butene, 1-octene, and the like.

Examples of the α,β-ethylenically unsaturated dicarboxylic acid diester monomers include, but should not be limited to, diesters of $C_4$ to $C_{12}$ α,β-ethylenically unsaturated dicarboxylic acids with $C_1$ to $C_8$ alcohols. The two organic groups in the diester may be the same or different.

Specific examples of the α,β-ethylenically unsaturated dicarboxylic acid diesters include maleic acid diesters such as dimethyl maleate, diethyl maleate, dipropyl maleate, di-n-butyl maleate, diisobutyl maleate, dicyclopentyl maleate, dicyclohexyl maleate, dibenzyl maleate, and diphenyl maleate; fumaric acid diesters such as dimethyl fumarate, diethyl fumarate, dipropyl fumarate, di-n-butyl fumarate, diisobutyl fumarate, dicyclopentyl fumarate, dicyclohexyl fumarate, dibenzyl fumarate, and diphenyl fumarate; citraconic acid diesters such as dimethyl citraconate, diethyl citraconate, dipropyl citraconate, di-n-butyl citraconate, dibenzyl citraconate, and diphenyl citraconate; itaconic acid diesters such as dimethyl itaconate, diethyl itaconate, di-n-butyl itaconate, diisobutyl itaconate, dicyclohexyl itaconate, dibenzyl itaconate, and diphenyl itaconate; mesaconic acid diesters such as dimethyl mesaconate, diethyl mesaconate, dipropyl mesaconate, di-n-butyl mesaconate, dibenzyl mesaconate, and diphenyl mesaconate; 2-pentenedioic acid diesters such as dimethyl 2-pentenedioate, diethyl 2-pentenedioate, dipropyl 2-pentenedioate, di-n-butyl 2-pentenedioate, dibenzyl 2-pentenedioate, and diphenyl 2-pentenedioate; dicyclohexyl acetylenedicarboxylate; and the like.

Specific examples of the vinyl ester compounds include vinyl acetate, vinyl propionate, vinyl pivalate, vinyl benzoate, vinyl cinnamate, and the like.

Specific examples of the vinyl ether compounds include ethyl vinyl ether, n-butyl vinyl ether, and the like.

Among these, preferred are styrene, acrylonitrile, methacrylonitrile, ethylene, and vinyl acetate, and more preferred are acrylonitrile, methacrylonitrile, ethylene, and vinyl acetate.

These other copolymerizable monomers can be used alone or in combination. The content of the other copolymerizable monomer units in the acrylic rubber is usually 40% by weight or less, preferably 30% by weight or less, more preferably 15% by weight or less, still more preferably 5% by weight or less, particularly, 0% by weight. In other words, preferably, the acrylic rubber used in the present invention substantially consists of the methacrylic acid alkyl ester monomer units (a), the acrylic acid ester monomer units (b), and the carboxyl group-containing monomer units (c).

The acrylic rubber used in the present invention can be prepared by polymerizing the monomers described above. The polymerization reaction can be performed by any one of emulsion polymerization, suspension polymerization method, bulk polymerization, and solution polymerization. Preferred is emulsion polymerization under ambient pressure, which is usually used as a conventionally known method of producing acrylic rubber, because the polymerization reaction is easily controlled.

Emulsion polymerization may be performed by any of a batchwise method, a semi-batchwise method, and a continuous method. The polymerization is usually performed at a temperature in the range of 0 to 70° C., preferably 5 to 50° C. It is not always necessary that all of the monomers described above are totally fed to the reaction system in the beginning of the reaction, and considering the copolymerization reactivity ratio, the reaction conversion rate, and the like, these monomers may be added continuously or intermittently across the entire reaction time, or may be introduced in batches or in portions in the middle of or in the latter half of the reaction. Although the proportions of the monomers to be charged in the polymerization reaction may be adjusted depending on the reactivity of each monomer, the polymerization reaction progresses substantially quantitatively in many cases. Thus, considering this, the proportions of the monomers to be charged may be determined depending on the proportions of monomer units of the target acrylic rubber. After the polymerization, coagulation and drying are performed to give a solid acrylic rubber.

The acrylic rubber used in the present invention has a weight average molecular weight (Mw) of preferably 50,000 to 5,000,000, more preferably 100,000 to 4,000,000, still more preferably 150,000 to 3,500,000, although not particularly limited thereto. The weight average molecular weight of the acrylic rubber can be measured by gel permeation chromatography as a value against polystyrene standards, for example.

The acrylic rubber used in the present invention has a Mooney viscosity (ML1+4, 100° C.) (polymer Mooney) of preferably 10 to 80, more preferably 20 to 70, still more preferably 25 to 60, although not particularly limited thereto.

The acrylic rubber composition according to the present invention comprises an antioxidant in addition to the acrylic rubber.

In the present invention, at least one of compounds represented by General Formulae (1) to (4) is used as the antioxidant. According to the present invention, use of an acrylic rubber having the specific monomer composition described above in combination with the antioxidant represented by any of General Formulae (1) to (4) can ensure high cold resistance and a dramatically enhanced effect of improving heat resistance, the effect being attributed to the antioxidant represented by any of General Formulae (1) to (4). Thus, the resulting cross-linked rubber can demonstrate high cold resistance and significantly improved heat resistance.

Hereinafter, details of the compounds represented by General Formulae (1) to (4) will be described.

(Compound Represented by General Formula (1))

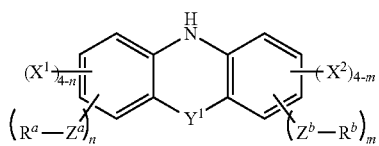

(1)

In General Formula (1), Y represents a chemical single bond, —S(=O)—, or —SO$_2$—, preferably —S(=O)—, and —SO$_2$—, more preferably —SO$_2$—.

In General Formula (1), $R^a$ and $R^b$ each independently represent a $C_1$ to $C_{30}$ organic group which may have a substituent.

Examples of the $C_1$ to $C_{30}$ organic group forming $R^a$ and $R^b$ include $C_1$ to $C_{30}$ alkyl groups such as a methyl group, an ethyl group, an n-propyl group, an isopropyl group, an n-butyl group, an isobutyl group, a sec-butyl group, a t-butyl group, an n-pentyl group, an n-hexyl group, an n-heptyl group, an n-octyl group, an n-nonyl group, and an n-decyl group; $C_3$ to $C_{30}$ cycloalkyl groups such as a cyclopropyl group, a cyclopentyl group, a cyclohexyl group, a cycloheptyl group, and a cyclooctyl group; $C_6$ to $C_{30}$ aryl groups such as a phenyl group, a biphenyl group, a naphthyl group, and an anthranil group; $C_1$ to $C_{30}$ alkoxy groups such as a methoxy group, an ethoxy group, an n-propoxy group, an isopropoxy group, an n-butoxy group, an isobutoxy group, a sec-butoxy group, a t-butoxy group, an n-pentyloxy group, and an n-hexyloxy group; and the like.

The organic group forming $R^a$ and $R^b$ described above may have a substituent at any position.

When the organic group is an alkyl group, examples of a substituent for the organic group include halogen atoms such as fluorine, chlorine, and bromine atoms; $C_1$ to $C_{10}$ alkoxy groups such as a methoxy group, an ethoxy group, and an isopropoxy group; a nitro group; a cyano group; substituted and non-substituted phenyl groups, such as a phenyl group, a 4-methylphenyl group, and a 2-chlorophenyl group; and the like.

When the organic group is a cycloalkyl group or an aryl group, examples thereof include halogen atoms such as fluorine, chlorine, and bromine atoms; $C_1$ to $C_{10}$ alkoxy groups such as a methoxy group, an ethoxy group, and an isopropoxy group; a nitro group; a cyano group; $C_1$ to $C_{10}$ alkyl groups such as a methyl group, an ethyl group, and a t-butyl group; and the like.

When the organic group is an alkoxy group, examples thereof include halogen atoms such as fluorine, chlorine, and bromine atoms; a nitro group; a cyano group; and the like.

When the organic group forming $R^a$ and $R^b$ has a substituent, the carbon atoms of the substituent are not counted as carbon atoms of the organic group. In other words, the number of carbon atoms of the organic group forming $R^a$ and $R^b$ is in the range of 1 to 30 excluding the carbon atoms contained in the substituent. For example, when the organic group forming $R^a$ and $R^b$ is a methoxyethyl group, the number of carbon atoms of the organic group is two. In other words, because the methoxy group is a substituent in this case, the number of carbon atoms of the organic group corresponds to that excluding the carbon atom of the methoxy group as the substituent.

In General Formula (1) above, it is preferred that $R^a$ and $R^b$ each independently be a linear or branched $C_1$ to $C_{20}$ alkyl group which may have a substituent, a phenyl group which may have a substituent, and a naphthyl group which may have a substituent. More preferred is a linear or branched $C_2$ to $C_8$ alkyl group which may have a substituent or a phenyl group which may have a substituent.

Preferred specific examples of the organic group forming $R^a$ and $R^b$ described above include an α-methylbenzyl group, an α,α-dimethylbenzyl group, a t-butyl group, a phenyl group, and a 4-methylphenyl group, and the like. Among these groups, particularly preferred is an α,α-dimethylbenzyl group or a 4-methylphenyl group. $R^a$ and $R^b$ can each be independent.

In General Formula (1), $Z^a$ and $Z^b$ each independently represent a chemical single bond or —SO$_2$—. Preferred is a chemical single bond.

In General Formula (1), $X^1$ and $X^2$ each independently represent a hydrogen atom, a halogen atom, a $C_1$ to $C_{10}$ alkyl group which may have a substituent, a cyano group, a nitro group, —OR$^1$, —O—C(=O)—R$^1$, —C(=O)—OR$^1$, —O—C(=O)—OR$^1$, —NR$^2$(R$^3$), —NR$^2$—C(=O)—R$^1$, —C(=O)—NR$^2$(R$^3$), or —O—C(=O)—NR$^2$(R$^3$).

Examples of the halogen atom forming $X^1$ and $X^2$ include fluorine, chlorine, bromine atoms, and the like.

Examples of the $C_1$ to $C_{10}$ alkyl groups for the $C_1$ to $C_{10}$ alkyl group which may have a substituent include a methyl group, an ethyl group, a propyl group, an isopropyl group, an n-butyl group, an isobutyl group, a t-butyl group, an n-pentyl group, an n-hexyl group, an n-heptyl group, an n-octyl group, an n-nonyl group, an n-decyl group, and the like.

Examples of the substituent for the $C_1$ to $C_{10}$ alkyl group include halogen atoms such as fluorine, chlorine, and bromine atoms; alkoxy groups such as a methoxy group, an ethoxy group, an n-propoxy group, an isopropoxy group, an n-butoxy group, and a t-butoxy group; a nitro group; a cyano group; and the like.

$R^1$, $R^2$, and $R^3$ each independently represent a hydrogen atom or a $C_1$ to $C_{20}$ organic group which may have a substituent, and it is preferred that $R^1$, $R^2$, and $R^3$ all be a hydrogen atom.

Examples of $C_1$ to $C_{20}$ organic groups for the $C_1$ to $C_{20}$ organic group which forms $R^1$, $R^2$, and $R^3$ and may have a substituent include $C_1$ to $C_{20}$ alkyl groups such as a methyl group, an ethyl group, an n-propyl group, an isopropyl group, an n-butyl group, an isobutyl group, a t-butyl group, an n-pentyl group, an n-hexyl group, an n-heptyl group, an n-octyl group, an n-nonyl group, and an n-decyl group; $C_3$ to $C_{20}$ cycloalkyl groups such as a cyclopropyl group, a cyclopentyl group, a cyclohexyl group, a cycloheptyl group, and a cyclooctyl group; $C_6$ to $C_{20}$ aryl groups such as a phenyl group, a naphthyl group, and an anthranil group; $C_1$ to $C_{20}$ alkoxy groups such as a methoxy group, an ethoxy group, an n-propoxy group, an isopropoxy group, an n-butoxy group, an isobutoxy group, a sec-butoxy group, a t-butoxy group, an n-pentyloxy group, and an n-hexyloxy group; and the like.

Examples of the substituent for the organic group forming $R^1$, $R^2$, and $R^3$ include the same substituents as those listed above as the substituents for the organic group forming $R^a$ and $R^b$.

Among these, $X^1$ and $X^2$ both are preferably a hydrogen atom from the viewpoint of availability.

In General Formula (1), "n" and "m" each independently represent an integer of 0 to 2, and one of "n" and "m" is not 0. It is preferred that "n" and "m" each independently be 0 or 1 (where one of "n" and "m" is not 0), and it is more preferred that "n" and "m" be 1. When "n" and/or "m" is 2, two $R^a$s and two $R^b$s each may be the same or different.

The compound represented by General Formula (1) is preferably any of compounds represented by General Formulae (5) to (12):

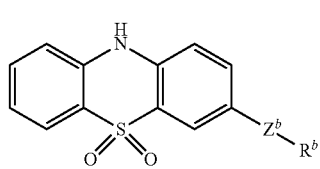 (5)

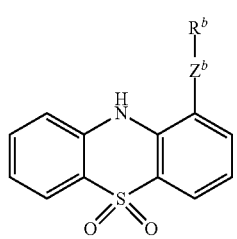 (6)

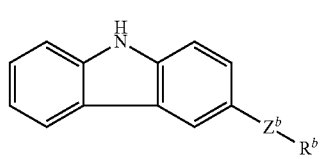 (7)

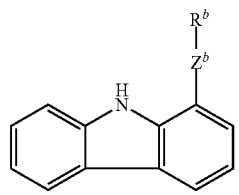 (8)

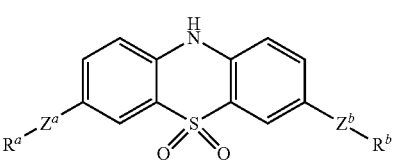 (9)

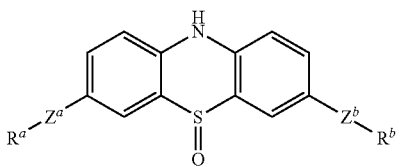 (10)

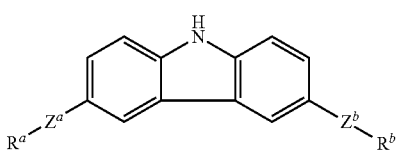 (11)

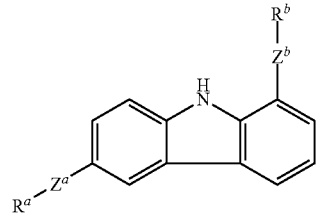 (12)

(where $R^a$, $R^b$, $Z^a$, and $Z^b$ are the same as those described in General Formula (1)).

Among these compounds represented by General Formulae (5) to (12), more preferred are compounds represented by General Formulae (5), (9), and (10), still more preferred are compounds represented by General Formulae (9) and (10), and particularly preferred are compounds represented by General Formula (9).

In General Formulae (5) to (12), more preferred are compounds where —$Z^a$—$R^a$ and —$Z^b$—$R^b$ each independently be an α-methylbenzyl group, an α,α-dimethylbenzyl group, a t-butyl group, a phenylsulfonyl group, or a 4-methylphenylsulfonyl group. Particularly preferred are compounds where —$Z^a$—$R^a$ and —$Z^b$—$R^b$ each independently be an α,α-dimethylbenzyl group.

The compound represented by General Formula (1) above can be synthesized by a process described in International Publication No. WO 2011/093443. For example, among the compounds represented by General Formula (1), a compound where Y is —S(=O)— and a compound where Y is —$SO_2$— can be prepared by preparing a compound where $Y^1$ in General Formula (1) is S by a known process of preparing a phenothiazine compound, and then oxidizing the compound. Among the compounds represented by General Formula (1), a compound where $Y^1$ is a single bond can be prepared by a known process of preparing a carbazole compound.

(Compound Represented by General Formula (2))

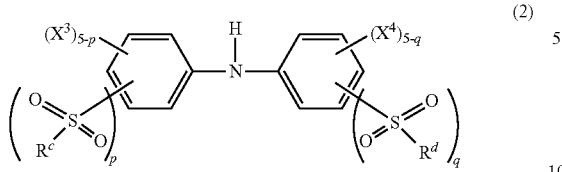

In General Formula (2), $R^c$ and $R^d$ each independently represent a $C_1$ to $C_{30}$ organic group which may have a substituent, and preferred is a $C_1$ to $C_{30}$ aromatic or cyclic aliphatic group which may have a substituent.

Examples of the $C_1$ to $C_{30}$ aromatic group include, but should not be limited to, aromatic hydrocarbon groups such as a phenyl group, a biphenyl group, a naphthyl group, a phenanthryl group, and an anthranil group; aromatic heterocyclic groups such as a furyl group, a pyrrolyl group, a thienyl group, a pyridyl group, and a thiazolyl group; and the like.

Examples of the $C_1$ to $C_{30}$ cyclic aliphatic group include, but should not be limited to, a cyclopropyl group, a cyclobutyl group, a cyclopentyl group, a cyclohexyl group, and the like. Among these, it is preferred that $R^c$ and $R^d$ each independently be a phenyl group or a 4-methylphenyl group.

The organic group forming $R^c$ and $R^d$ described above may have a substituent at any position. Examples of such a substituent include halogen atoms such as fluorine, chlorine, and bromine atoms; $C_1$ to $C_{10}$ alkoxy groups such as a methoxy group, an ethoxy group, and an isopropoxy group; a nitro group; a cyano group; $C_1$ to $C_{10}$ alkyl groups such as a methyl group, an ethyl group, and a t-butyl group; and the like.

When the organic group forming $R^c$ and $R^d$ in General Formula (2) has a substituent, the carbon atoms of the substituent are not counted as carbon atoms of the organic group.

In General Formula (2), $X^3$ and $X^4$ each independently represent a hydrogen atom, a halogen atom, a $C_1$ to $C_{10}$ alkyl group which may have a substituent, such as a methyl group, an ethyl group, an n-propyl group, an isopropyl group, an n-butyl group, an isobutyl group, a sec-butyl group, a t-butyl group, an n-pentyl group, an n-hexyl group, an n-heptyl group, an n-octyl group, an n-nonyl group, and an n-decyl group, a cyano group, a nitro group, —$OR^4$, —O—C(=O)—$R^4$, —C(=O)—$OR^4$, —O—C(=O)—$OR^4$, $NR^5(R^6)$—, —$NR^5$—C(=O)—$R^4$, —C(=O)—$NR^5(R^6)$, or —O—C(=O)—$NR^5(R^6)$. Here, $R^4$, $R^5$, and $R^6$ each independently represent a hydrogen atom or a $C_1$ to $C_{20}$ organic group which may have a substituent, and all of a plurality of $X^3$s and a plurality of $X^4$s may each independently have different substituents. It is preferred that $X^3$ and $X^4$ all be a hydrogen atom.

For $X^3$ and $X^4$, examples of the substituents for the $C_1$ to $C_{10}$ alkyl groups which may have a substituent include the same substituents as those listed as the substituents for the $C_1$ to $C_{30}$ alkyl groups which may have a substituent, in the description of $R^a$ and $R^b$.

In the present invention, as the compound represented by General Formula (2), a compound is preferably selected where $R^c$ and $R^d$ each independently represent a $C_1$ to $C_{30}$ aromatic group or cyclic aliphatic group which may have a substituent, $X^3$ and $X^4$ represent a hydrogen atom, and "p" and "q" are 1, and a compound represented by the following General Formula (13) is more preferable:

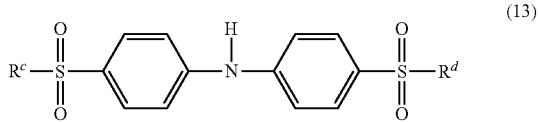

(where $R^c$ and $R^d$ are the same as those in General Formula (2)).

The compound represented by General Formula (2) can be prepared by a known production process. For example, the compound can be synthesized by the reaction process according to International Publication No. WO 2011/058918.

(Compound Represented by General Formula (3))

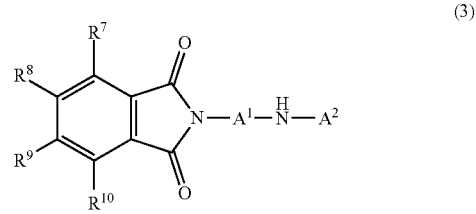

In General Formula (3), A' and $A^2$ each independently represent an aromatic group which may have a $C_1$ to $C_{30}$ substituent. $R^7$, $R^9$, and $R^{10}$ each independently represent a hydrogen atom, a halogen atom, a $C_1$ to $C_{10}$ alkyl group which may have a substituent, a cyano group, a nitro group, —$OR^{1a}$, —O—C(=O)—$R^{1a}$, —C(=O)—$OR^{1a}$, —O—C(=O)—$OR^{1a}$, —$NR^{1b}$—C(=O)—$R^{1a}$, —C(=O)—$NR^{1a}R^{1c}$, or —O—C(=O)—$NR^{1a}R^{1c}$. $R^{1a}$ and $R^{1c}$ each independently represent a hydrogen atom or a $C_1$ to $C_{30}$ organic group which may have a substituent. Each $R^{10}$ independently represents a hydrogen atom or a $C_1$ to $C_6$ alkyl group. The $C_1$ to $C_{30}$ organic group forming $R^{1a}$ and RIC may include at least one linking group selected from the group consisting of —O—, —S—, —O—C(=O)—, —C(=O)—O—, —O—C(=O)—O—, —$NR^{1d}$—C(=O)—, —C(=O)—$NR^{14}$—, —$NR^{14}$—, and —C(=O)—, except for the case where a linking group consisting of two or more adjacent —O— or —S— groups is included. Each $R^{1d}$ independently represents a hydrogen atom or a $C_1$ to $C_6$ alkyl group.

In General Formula (3), $R^8$ represents a hydrogen atom, a halogen atom, a $C_1$ to $C_{10}$ alkyl group which may have a substituent, a cyano group, a nitro group, —O—C(=O)—$R^{1e}$, —C(=O)—$OR^{1e}$, —$NR^{1b}$—C(=O)—$R^{1e}$, —C(=O)—$NR^{1e}R^{1f}$, or —O—C(=O)—$NR^{1e}R^{1f}$. $R^{1e}$ and $R^{1f}$ each independently represent a $C_1$ to $C_{30}$ organic group which may have a substituent. The $C_1$ to $C_{30}$ organic group forming $R^{1e}$ and $R^f$ may include at least one linking group selected from the group consisting of —O—, —S—, —O—C(=O)—, —C(=O)—O—, —O—C(=O)—O—, —$NR^{1d}$ C(=O)—, —C(=O)—$NR^{1d}$—, —$NR^{1d}$—, and —C(=O)—, except for the case where a linking group consisting of two or more adjacent —O— or —S— groups is included. $R^{1b}$ and $R^{1d}$ each independently represent a hydrogen atom or a $C_1$ to $C_6$ alkyl group.

In one preferred aspect, as the compound represented by General Formula (3), a compound can be selected where $A^1$ is a phenylene group which may have a $C_1$ to $C_{30}$ substituent, $A^2$ is a phenyl group which may have a $C_1$ to $C_{30}$ substituent, $R^7$, $R^9$, and $R^1$ are a hydrogen atom, $R^8$ is —O—C(=O)—R$^{1e}$, —C(=O)—OR$^{1e}$, —NR—C(=O)—R$^{1e}$, —C(=O)—NR$^{1e}$R$^{1f}$, or —O—C(=O)—NR$^{1e}$R$^{1f}$, R$^{1b}$ is a hydrogen atom or a C$_1$ to C$_6$ alkyl group, and R$^{1e}$ and R$^{1f}$ each independently represent a C$_1$ to C$_{30}$ organic group which may have a substituent.

In a more preferred aspect among these preferred aspects, as the compound represented by General Formula (3), a diarylamine compound can be selected where in General Formula (3), R$^8$ is —C(=O)—OR$^{1e}$, R$^{1e}$ is a phenyl group which may have a C$_1$ to C$_{18}$ substituent or a naphthyl group which may have a C$_1$ to C$_{18}$ substituent.

In a still more preferred aspect among these preferred aspects, as the compound represented by General Formula (3), a diarylamine compound can be selected where in General Formula (3), R$^8$ is —C(=O)—OR$^{1e}$; R$^{1e}$ is a C$_1$ to C$_{10}$ alkyl group which may have a substituent or a C$_4$ to C$_{30}$ aromatic group which may have a substituent; each substituent forming R$^{1e}$ independently is a halogen atom, a C$_1$ to C$_{10}$ alkyl group, a C$_1$ to C$_{20}$ aralkyl group, a C$_6$ to C$_{30}$ aromatic group, a cyano group, a nitro group, a sulfo group, —OR, —O—C(=O)—R, —C(=O)—OR, —O—C(=O)—OR, —NR"—C(=O)—R, —C(=O)—NRR', —O—C(=O)—NRR', —SR, —S(=O)—R, or —S(=O)$_2$—R, and R, R', and R" each independently represent a hydrogen atom, a C$_1$ to C$_8$ alkyl group, or a phenyl group; A$^1$ and A$^2$ each independently represent a C$_6$ to C$_{30}$ aromatic group which may have a substituent; and the substituent forming A$^1$ and A$^2$ is a C$_1$ to C$_{10}$ alkyl group, a halogen-substituted C$_1$ to C$_{10}$ alkyl group, a halogen atom, a cyano group, or a nitro group. In other words, a diarylamine compound containing a phthalimide group having an ester group at the 4-position can be selected, which is represented by General Formula (14):

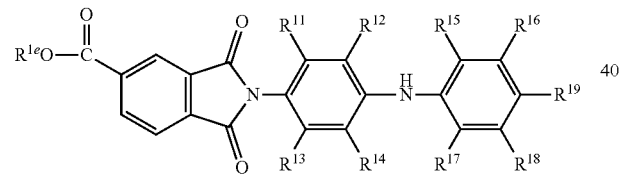

(14)

In General Formula (14), R$^{11}$ to R$^{19}$ each independently represent a hydrogen atom, a C$_1$ to C$_{10}$ alkyl group, a halogen-substituted C$_1$ to C$_{10}$ alkyl group, a halogen atom, a cyano group, or a nitro group.

Furthermore, the diarylamine compound represented by General Formula (3) will be specifically described.

In General Formula (3), R$^8$ is preferably an ester group represented by —C(=O)—OR$^{1e}$ because the compound is easily prepared. Here, R$^{1e}$ is a C$_1$ to C$_{30}$ organic group which may have a substituent, and the C$_1$ to C$_{30}$ organic group forming R$^{1a}$ can be selected from many aliphatic groups, such as alkyl groups, cycloalkyl groups, aryl groups, arylalkyl groups, alkylaryl groups, arylalkylaryl groups, and alkoxy groups, and aromatic groups. From the viewpoint of heat resistance, aromatic groups, particularly, a phenyl group or a naphthyl group can be preferably selected.

Furthermore, if in General Formula (3), R$^8$ is —C(=O)—OR$^{1e}$ and R$^{1e}$ is a C$_1$ to C$_{20}$ aromatic group which may have a substituent, use of such a compound as an antioxidant is particularly preferred because a higher heat resistance improving effect is ensured. Most preferably, R$^8$ is an ester structure represented by —C(=O)—OR$^{1e}$ where R$^{1e}$ is a phenyl group which may have a C$_1$ to C$_{18}$ substituent or a naphthyl group which may have a C$_1$ to C$_{18}$ substituent, because a much higher heat resistance improving effect is ensured.

The compound represented by General Formula (3) can be prepared by a known production process. For example, the compound can be synthesized by the reaction process according to Japanese Patent No. 5732673.

(Compound represented by General Formula (4))

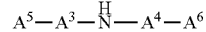

(4)

In General Formula (4), A$^3$ and A$^4$ each independently represent a C$_6$ to C$_{18}$ arylene group which may have a substituent, and A$^5$ and A$^6$ each independently represent an organic group having a cyclic imide structure which may have a substituent.

In General Formula (4), A$^3$ and A$^4$ each independently represent a C$_6$ to C$_{18}$ arylene group which may have a substituent, preferably a C$_6$ to C$_{10}$ arylene group which may have a substituent, more preferably a phenylene group which may have a substituent, still more preferably a 1,4-phenylene group. Particularly preferably, A$^3$ and A$^4$ both are a 1,4-phenylene group because a better antioxidant effect is ensured. Examples of the substituents include halogen atoms such as fluorine, chlorine, and bromine atoms; C$_1$ to C$_{10}$ alkoxy groups such as a methoxy group, an ethoxy group, and an isopropoxy group; a nitro group; a cyano group; C$_1$ to C$_{10}$ alkyl groups such as a methyl group, an ethyl group, and a t-butyl group; and the like.

In General Formula (4), A$^5$ and A$^6$ each independently represent an organic group having a cyclic imide structure which may have a substituent, and are preferably an organic group represented by General Formula (15) or (16):

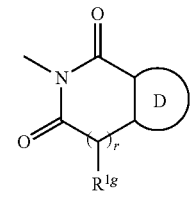

(15)

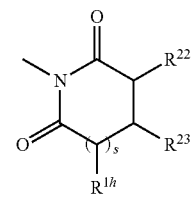

(16)

In General Formula (15), D represents a C$_6$ to C$_{18}$ ring which may have a substituent, preferably a C$_6$ to C$_{10}$ ring which may have a substituent; and D may be monocyclic or polycyclic. Examples of the substituent in this case include C$_1$ to C$_{30}$ alkyl groups, C$_1$ to C$_{30}$ alkenyl groups, —O—R$^{20}$, —O—C(=O)—R$^{20}$, —C(=O)—O—R$^{20}$, —C(=O)—NR$^{20}$(R$^{21}$), —NR$^{20}$—C(=O)—R$^{21}$, —CN, —SR$^{20}$, —S(=O)—R$^{20}$, —S(=O)$_2$—R$^{20}$, and the like. R$^{20}$ and R$^{21}$ each independently represent a C$_1$ to C$_{30}$ alkyl group, a C$_1$ to C$_{30}$ alkenyl group, or a C$_6$ to C$_{12}$ aromatic group. "r" represents 0 or 1, preferably 0. Examples of R$^{1g}$ include a hydrogen atom, a $C_1$ to $C_{30}$ alkyl group, a $C_1$ to $C_{30}$ alkenyl group, —O—$R^{20}$, —O—C(=O)—$R^{20}$, —C(=O)—O—$R^{20}$, —C(=O)—N$R^{20}(R^{21})$, —N$R^{20}$—C(=O)—$R^{21}$, —CN, —S$R^{20}$, —S—(=O)—$R^{20}$, and —S(=O)$_2$—$R^{20}$. $R^{20}$ and $R^{21}$ each independently represent a $C_1$ to $C_{30}$ alkyl group, a $C_1$ to $C_{30}$ alkenyl group, or a $C_6$ to $C_{12}$ aromatic group.

In General Formula (16), $R^{22}$, $R^{23}$, and $R^{1h}$ each independently represent a hydrogen atom, a $C_1$ to $C_{30}$ alkyl group, a $C_1$ to $C_{30}$ alkenyl group, —O—$R^{20}$, —O—C(=O)—$R^{20}$, —C(=O)—O—$R^{20}$, —C(=O)—N$R^{20}(R^{21})$, —N$R^{20}$—C(=O)—$R^{21}$, —CN, —S$R^{20}$, —S—(=O)—$R^{20}$, or —S(=O)$_2$—$R^{20}$, $R^{20}$ and $R^{21}$ each independently represent a $C_1$ to $C_{30}$ alkyl group, a $C_1$ to $C_{30}$ alkenyl group, or a $C_6$ to $C_{12}$ aromatic group. The organic group forming $R^{22}$, $R^{23}$, and $R^{1h}$ described above may have a substituent. In the case where the organic group has a substituent, examples of the substituent include halogen atoms such as fluorine, chlorine, and bromine atoms; $C_1$ to $C_{10}$ alkoxy groups such as a methoxy group, an ethoxy group, and an isopropoxy group; a nitro group; a cyano group; substituted and non-substituted phenyl groups, such as a phenyl group, a 4-methylphenyl group, and a 2-chlorophenyl group; and the like. "s" represents 0 or 1, and is preferably 0.

Among these organic groups forming $A^5$ and $A^6$, which are represented by General Formula (15) or (16), preferred is any of organic groups represented by General Formulae (17) to (22) to attain a better antioxidant effect.

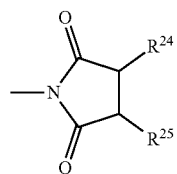

(17)

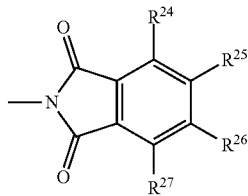

(18)

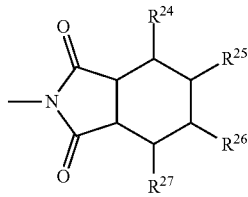

(19)

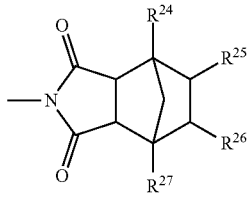

(20)

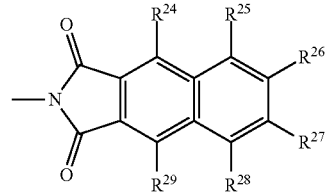

(21)

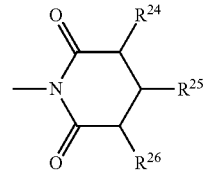

(22)

In General Formulae (17) to (22), $R^{24}$ to $R^{29}$ each independently represent a hydrogen atom, a $C_1$ to $C_{30}$ alkyl group, a $C_1$ to $C_{30}$ alkenyl group, —O—$R^{30}$, —O—C(=O)—$R^{30}$, —C(=O)—O—$R^{30}$, —C(=O)—N$R^{30}(R^{31})$, —N$R^{30}$—C(=O)—$R^{31}$, —CN, —S$R^{30}$, —S—(=O)—$R^{30}$, or —S(=O)$_2$—$R^{30}$; and $R^{30}$ and $R^{31}$ each independently represent a $C_1$ to $C_{30}$ alkyl group, a $C_1$ to $C_{30}$ alkenyl group, or a $C_6$ to $C_{12}$ aromatic group. It is preferred that $R^{24}$ to $R^{29}$ each independently be a hydrogen atom or a $C_1$ to $C_{30}$ alkyl group. More preferred is a hydrogen atom or a $C_1$ to $C_{20}$ alkyl group. Particularly preferred is a hydrogen atom or a $C_1$ to $C_{10}$ alkyl group. When two or more $R^{24}$s to $R^{29}$s are present, these may be the same or different.

Among these organic groups represented by General Formulae (17) to (22) above, to further enhance the antioxidant effect, more preferred is an organic group represented by General Formula (17), (18), (20), or (21), still more preferred is an organic group represented by General Formula (17), (18), or (21), and particularly preferred is an organic group represented by General Formula (18).

The compound represented by General Formula (4) is preferably any of compounds represented by General Formulae (23) to (26):

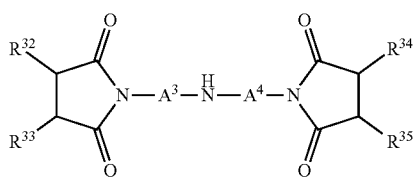

(23)

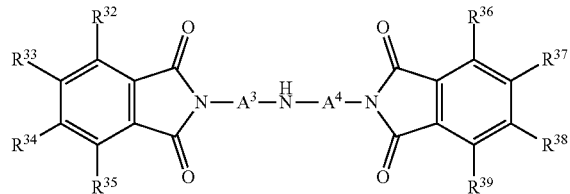

(24)

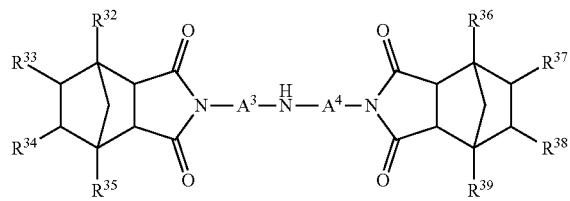

(25)

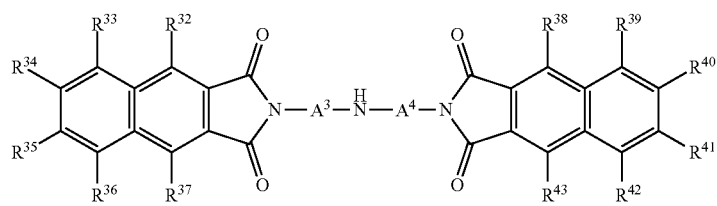

(26)

In General Formulae (23) to (26), $R^{32}$ to $R^{43}$ each independently represent a hydrogen atom, a $C_1$ to $C_{30}$ alkyl group, a $C_1$ to $C_{30}$ alkenyl group, —$OR^{44}$, —O—C(=O)—$R^{44}$, —C(=O)—$OR^{44}$, —C(=O)—$NR^{44}(R^{45})$, —$NR^{44}$—C(=O)—$R^{45}$, —CN, —$SR^{44}$, —S—(=O)—$R^{44}$, or —S(=O)$_2$—$R^{44}$; and $R^{44}$ and $R^{45}$ each independently represent a $C_1$ to $C_{30}$ alkyl group, a $C_1$ to $C_{30}$ alkenyl group, or a $C_6$ to $C_{12}$ aromatic group. It is preferred that R to R each independently be a hydrogen atom or a $C_1$ to $C_{30}$ alkyl group. More preferred is a hydrogen atom or a $C_1$ to $C_{20}$ alkyl group. Particularly preferred is a hydrogen atom or a $C_1$ to $C_{10}$ alkyl group. $A^3$ and $A^4$ are the same as those in General Formula (4) above.

Among these compounds represented by General Formulae (23) to (26), particularly preferred are compounds represented by General Formula (24), which can further enhance the antioxidant effect.

The compound represented by General Formula (4) can be prepared by a known production process. For example, the compound can be synthesized by the reaction process according to International Publication No. WO 2018/159459.

In addition to the compounds represented by General Formulae (1) to (4), the acrylic rubber composition according to the present invention may further contain a different antioxidant other than the compounds represented by General Formulae (1) to (4). Although the different antioxidant is not particularly limited, the following phenol antioxidants can be used: monophenol antioxidants such as 2,6-di-t-butyl-p-cresol, 2,6-di-t-butyl-4-ethylphenol, 2,6-di-t-butyl-4-methylphenol, 2,6-di-t-butyl-4-sec-butylphenol, 2-(1-methylcyclohexyl)-4,6-dimethylphenol, 2,6-di-t-butyl-α-dimethylamino-p-cresol, 2,4-bis[(octylthio)methyl]-o-cresol, styrenated phenol, and alkylated phenols; bis-, tris-, or polyphenol antioxidants such as 2,2'-methylenebis(4-methyl-6-t-butylphenol), 2,2'-methylenebis(4-ethyl-6-t-butylphenol), 4,4'-methylenebis(2,6-di-t-butylphenol), 2,2'-methylenebis(6-α-methylbenzyl-p-cresol), methylene-bridged polyvalent alkylphenols, 4,4'-butylidenebis(6-t-butyl-m-cresol), 4,4'-butylidenebis(3-methyl-6-t-butylphenol), 2,2'-ethylidenebis(4,6-di-t-butylphenol), 1,1-bis-(4-hydroxyphenyl)cyclohexane, 2,2'-dihydroxy-3,3'-(α-methylcyclohexyl)-5,5'-dimethyldiphenylmethane, alkylated bisphenols, butylated reaction products of p-cresol and dicyclopentadiene, 2,5-di-t-butylhydroquinone, and 2,5-di-t-amylhydroquinone; and thiobisphenol antioxidants such as 4,4'-thiobis(6-t-butyl-m-cresol), 4,4'-thiobis(6-t-butyl-o-cresol), 4,4'-thiobis(3-methyl-6-t-butylphenol), and bis(3,5-di-t-butyl-4-hydroxybenzyl) sulfide. The following antioxidants can also be used: aromatic secondary amine compounds such as phenyl-α-naphthylamine, octylated diphenylamine, 4,4'-bis(α,α-dimethylbenzyl)diphenylamine, p-(p-toluenesulfonylamide) diphenylamine, p-isopropoxydiphenylamine, bis(phenylisopropylidene)-4,4-diphenylamine, N,N'-diphenylethylenediamine, N,N'-diphenylpropylenediamine, N,N'-diphenyl-p-phenylenediamine, N-isopropyl-N'-phenyl-p-phenylenediamine, N,N'-di-2-naphthyl-p-phenyldiamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N-bis(1,4-dimethylpentyl)-p-phenylenediamine, 4-(α-phenylethyl)diphenylamine, 4,4'-bis(α-phenylethyl)diphenylamine, and 4,4'-bis(4-methylphenyl) sulfonyl)diphenylamine; nickel dialkyl dithiocarbamates such as nickel dimethyldithiocarbamate, nickel diethyldithiocarbamate, and nickel dibutyldithiocarbamate; and the like.

The content of the antioxidant in the acrylic rubber composition according to the present invention is 0.1 to 5 parts by weight, preferably 0.3 to 3.5 parts by weight, more preferably 0.4 to 3 parts by weight, still more preferably 0.9 to 2.8 parts by weight relative to 100 parts by weight of the acrylic rubber. A content of the antioxidant within this range can ensure higher heat resistance of the resulting crosslinked rubber.

The acrylic rubber composition according to the present invention may further comprise a cross-linking agent. The acrylic rubber composition according to the present invention can be made cross-linkable (cross-linkable acrylic rubber composition) by the cross-linking agent contained therein, and can be formed into a cross-linked rubber by heating, for example.

The cross-linking agent is not particularly limited, and the following cross-linking agents traditionally known can be used, for example: polyvalent amine compounds such as diamine compounds and carbonates thereof; sulfur; sulfur donors; triazinethiol compounds; ammonium salts of organic carboxylic acids; metal salts of dithiocarbamic acids; polyvalent carboxylic acids; quaternary onium salts; imidazole compounds; isocyanuric acid compounds; organic peroxides; and the like. For example, the cross-linking agent can be appropriately selected depending on the presence/absence of cross-linkable monomer units of the acrylic rubber and the type of the cross-linkable monomer units. These cross-linking agents can be used alone or in combination.

Although the polyvalent amine compounds and carbonates thereof are not particularly limited, preferred are $C_4$ to $C_{30}$ polyvalent amine compounds and carbonates thereof. Examples of such polyvalent amine compounds and carbonates thereof include aliphatic polyvalent amine compounds and carbonates thereof, aromatic polyvalent amine compounds, and the like. On the other hand, those having a non-conjugated nitrogen-carbon double bond, such as guanidine compounds, are excluded.

Examples of the aliphatic polyvalent amine compounds and carbonates thereof include, but should not be limited to, hexamethylenediamine, hexamethylenediamine carbamate, N,N'-dicinnamylidene-1,6-hexanediamine, and the like. Among these, hexamethylenediamine carbamate is preferred.

Examples of the aromatic polyvalent amine compounds include, but should not be limited to, 4,4'-methylenedianiline, p-phenylenediamine, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy) biphenyl, m-xylylenediamine, p-xylylenediamine, 1,3,5-benzenetriamine, and the like. Among these, 2,2'-bis[4-(4-aminophenoxy)phenyl]propane is preferred.

Examples of the sulfur donors include dipentamethylene thiuram hexasulfide, triethylthiuram disulfide, and the like.

Examples of the triazinethiol compounds include 1,3,5-triazine-2,4,6-trithiol, 6-anilino-1,3,5-triazine-2,4-dithiol, 6-dibutylamino-1,3,5-triazine-2,4-dithiol, 6-diallylamino-1,3,5-triazine-2,4-dithiol, 6-octylamino-1,3,5-triazine-2,4-dithiol, and the like. Among these, preferred is 1,3,5-triazine-2,4,6-trithiol.

Examples of the ammonium salts of carboxylic acids include ammonium benzoate, ammonium adipate, and the like.

Examples of the metal salts of dithiocarbamic acids include zinc dimethyldithiocarbamate, and the like.

Examples of the polyvalent carboxylic acids include tetradecanedioic acid, and the like.

Examples of the quaternary onium salts include cetyltrimethylammonium bromide, and the like.

Examples of the imidazole compounds include 2-methylimidazole, and the like.

Examples of the isocyanuric acid compounds include ammonium isocyanurate, and the like.

The amount of the cross-linking agent to be compounded in the acrylic rubber composition according to the present invention is preferably 0.05 to 20 parts by weight, more preferably 0.1 to 15 parts by weight, still more preferably 0.3 to 12 parts by weight relative to 100 parts by weight of the acrylic rubber. A content of the cross-linking agent within this range can ensure sufficient cross-linking, resulting in a cross-linked rubber having high mechanical properties.

Besides the components described above, the acrylic rubber composition according to the present invention may contain compounding agents usually used in the rubber processing field. Examples of such compounding agents include reinforcing fillers such as carbon black and silica; non-reinforcing fillers such as calcium carbonate and clay; cross-linking accelerators; photostabilizers; plasticizers; processing aids; lubricants; tackifiers; lubricating agents; flame retardants; antifungal agents; antistatic agents; colorants; silane coupling agents; cross-linking retarders; and the like. The amounts of these compounding agents are not particularly limited in the range not inhibiting the object and effects of the present invention, and these compounding agents can be compounded in appropriate amounts according to the purpose of their use.

Although not particularly limited, the Mooney viscosity (ML1+4, 100° C.) (compound Mooney) of the acrylic rubber composition according to the present invention is preferably 20 to 100, more preferably 30 to 90, still more preferably 35 to 80. The acrylic rubber composition having a Mooney viscosity within this range can enhance the processability of the acrylic rubber composition, and can further enhance the tensile strength of the resulting acrylic cross-linked rubber.

<Method of Preparing Acrylic Rubber Composition>

The method of preparing the acrylic rubber composition according to the present invention is not particularly limited, and suitable is a method of mixing the acrylic rubber and the antioxidant with a variety of compounding agents optionally added.

Examples of the mixing method include, but should not be limited to, kneading methods using a kneading machine such as a roll, an intermix, a kneader, a Banbury mixer, or a screw mixer. Mixing of these materials may be performed in a solvent.

When the cross-linking agent is compounded, the components other than the cross-linking agent, a thermally unstable cross-linking aid, and the like are kneaded with a mixer such as a Banbury mixer, a Brabender mixer, an intermixer, or a kneader. The kneaded product is transferred to a roll or the like, and the cross-linking agent, the thermally unstable cross-linking aid, and the like are added to perform secondary kneading. Thus, the acrylic rubber composition according to the present invention can be prepared.

As described above, the acrylic rubber composition according to the present invention can be given. The acrylic rubber composition according to the present invention comprises the acrylic rubber having the specific monomer composition above and the antioxidant, and particularly, at least one antioxidant selected from the compounds represented by General Formulae (1) to (4) is used as the antioxidant. In particular, according to the present invention, use of an acrylic rubber having the specific monomer composition described above in combination with the antioxidant represented by any of General Formulae (1) to (4) can ensure high cold resistance and a dramatically enhanced effect of improving heat resistance, the effect being attributed to the antioxidant represented by any of General Formulae (1) to (4). Thus, the resulting cross-linked rubber can demonstrate high cold resistance and significantly improved heat resistance.

According to the present invention, when the cross-linking agent is compounded with the acrylic rubber composition according to the present invention, a cross-linked rubber can be given by cross-linking the resulting acrylic rubber composition.

The cross-linked rubber is produced by forming the acrylic rubber composition containing the cross-linking agent and cross-linking the formed acrylic rubber composition. Examples of methods of forming and cross-linking the acrylic rubber composition include, but should not be limited to, a method of extruding the cross-linkable rubber composition into a molded body with a single- or multi-screw extruder, and then cross-linking the molded product by heating; a method of molding the acrylic rubber composition with a metal mold using an injection molding machine, an extrusion blow molding machine, a transfer molding machine, a press molding machine, or the like, and simultaneously cross-linking the acrylic rubber composition by heat during the molding; and the like. Among these methods, preferred are methods using an extruder or an injection molding machine, and particularly preferred are those using an extruder. Forming and cross-linking may be simultaneously performed, or cross-linking may be performed after forming, and the timings thereof may be selected depending on the forming method, the vulcanization method, the size of the molded body, and the like.

The forming temperature during forming and cross-linking of the acrylic rubber composition is preferably 15 to 220° C., more preferably 20 to 200° C. The cross-linking temperature is preferably 100° C. or more, more preferably 120° C. to 250° C. The cross-linking time may be arbitrarily selected in the range of 1 minute to 5 hours. As the heating method, a method usually used in cross-linking of the rubber may be appropriately selected, for example, electric heating, steam heating, oven heating, ultra high frequency (UHF) heating, hot air heating, and the like.

Depending on the shape, the size, and the like thereof, the inside of the cross-linked rubber may not be sufficiently cross-linked, even when the surface thereof is cross-linked. For this reason, the cross-linked rubber may be further heated for secondary cross-linking. When secondary cross-linking is performed, the heating temperature is preferably 100 to 220° C., more preferably 130 to 210° C., and the heating time is preferably 30 minutes to 10 hours, more preferably 1 to 5 hours.

Because the cross-linked rubber thus obtained is produced using the acrylic rubber composition according to the present invention, the cross-linked rubber has high heat resistance and high cold resistance in a good balance. For this reason, utilizing the properties, the cross-linked rubber thus obtained is suitably used as a variety of seals such as 0-rings, packings, diaphragms, oil seals, shaft seals, bearing seals, mechanical seals, wellhead seals, seals for electrical and electronic devices, and seals for pneumatic apparatuses and devices; a variety of gaskets, such as a cylinder head gasket attached to a connection between a cylinder block and a cylinder head, a rocker cover gasket attached to a connection between a rocker cover and a cylinder head, an oil pan gasket attached to a connection between an oil pan and a cylinder block or a transmission case, a gasket for fuel cell separators, which is included between a pair of housings which sandwich a unit cell including a positive electrode, an electrolyte plate, and a negative electrode, and a gasket for top covers for hard disk drives; a variety of belts; a variety of hoses such as fuel hoses, turbo air hoses, oil hoses, radiator hoses, heater hoses, water hoses, vacuum brake hoses, control hoses, air conditioner hoses, brake hoses, power steering hoses, air hoses, marine hoses, risers, flow lines, transmission oil cooler hoses, engine oil cooler hoses, turbo intercooler hoses, and diesel turbocharger hoses; a variety of boots such as CVJ boots, propeller shaft boots, constant-velocity joint boots, and rack and pinion boots; rubber parts for damping materials such as cushion materials, dynamic dampers, rubber couplings, air springs, and vibration insulators. In particular, the cross-linked rubber can also be suitably used as a sealing material or a hose material.

EXAMPLES

Hereinafter, the present invention will be specifically described based on Examples, but these Examples should not be construed as limitations to the present invention. In the description below, "%" and "parts" indicating amounts are weight-based, unless otherwise specified. A variety of physical properties were measured as follows.

<Mooney Viscosity (ML1+4100° C.)>

The Mooney viscosity (compound Mooney) at a measurement temperature of 100° C. of the acrylic rubber composition was measured according to JIS K6300.

<Normal State Physical Properties (Tensile Strength, Elongation, and Hardness)>

Acrylic rubber compositions prepared in Examples and Comparative Examples each were placed into a metal mold measuring 15 cm in length, 15 cm in width, and 0.2 cm in depth, and were pressed at 170° C. for 20 minutes under a pressing pressure of 10 MPa to prepare sheet-shaped cross-linked rubbers. The prepared sheet-shaped cross-linked rubbers were placed into a gear oven, and were subjected to a heat treatment at 170° C. for 4 hours. Subsequently, the sheet-shaped cross-linked rubbers were punched out with a #3 dumbbell cutter to prepare test pieces. These test pieces were measured for tensile strength (MPa) and elongation (%) according to JIS K6251. These test pieces were also measured for hardness with a Durometer hardness tester (type A) according to JIS K6253.

<Heat Aging Resistance Test>

Test pieces prepared in the same manner as in those used in the evaluations of the normal state physical properties above were left under a 200° C. environment in a gear oven for 336 hours, and then were measured for the elongation (the retained elongation after heating). From the results of measurement, the elongation change $\Delta E$ (%) was calculated using the following expression. The elongation was measured according to JIS K6251. A smaller absolute value of the elongation change $\Delta E$ (%) indicates higher heat aging resistance.

Elongation change $\Delta E$ (%)=100×{(retained elongation (%) after heating−elongation (%) before heating)/elongation (%) before heating}

<Cold Resistance Test>

The cold resistance test performed was a low-temperature retraction test (TR test) according to JIS K6261. Specifically, test pieces prepared in the same manner as in those used in the evaluations of the normal state physical properties above were punched out to prepare test pieces for the cold resistance test, each of which was composed of a holder of a 6.5 mm square at both ends and a parallel portion of 100.0±0.2 mm in length, 2.0±0.2 mm in width, and 2.0±0.2 mm in thickness extending between the holders. The resulting test pieces for the cold resistance test were frozen, and the retraction of each test piece elongated by continuously raising the temperature was measured to determine the temperature (hereinafter, referred to as $TR^{10}$) at which the retraction rate was 10%. A lower value of $TR^{10}$ indicates higher cold resistance.

Production Example 1: Acrylic Rubber (α-1)

200 parts of water, 3 parts of sodium lauryl sulfate, 74.5 parts of n-butyl acrylate, 24 parts of methyl methacrylate, and 1.5 parts of mono-n-butyl maleate were placed into a polymerization reactor provided with a thermometer and a stirrer, and oxygen was sufficiently removed by performing degassing under reduced pressure and purging with nitrogen twice. Subsequently, 0.005 parts of cumene hydroperoxide and 0.002 parts of sodium formaldehydesulfoxylate were added to initiate emulsion polymerization under normal pressure at a temperature of 30° C. The reaction was continued until the polymerization conversion ratio reached 95%, and a polymerization terminator was added to terminate polymerization. In the next step, the resulting emulsion polymerization solution was coagulated with a calcium chloride aqueous solution. The product was washed with water, and was dried to give an acrylic rubber (α-1).

Production Examples 2 to 14: Acrylic Rubbers (α-2) to (α-14)

Acrylic rubbers (α-2) to (α-14) were prepared in the same manner as in Production Example 1 except that the monomers and the amounts thereof used in polymerization were varied.

Production Example 15: Antioxidant Represented by Formula (A)

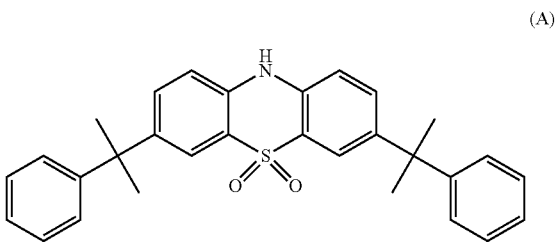 [SMILES: CC(C)(c1ccccc1)c1ccc2c(c1)S(=O)(=O)c1cc(C(C)(C)c3ccccc3)ccc1N2]

(A)

Initially, 50.0 g (250.92 mmol) of phenothiazine was placed into a three-necked reactor provided with a thermometer in a nitrogen stream, and was dissolved in 200 ml of toluene. Subsequently, 59.31 g (501.83 mmol) of α-methylstyrene and 1.19 g (6.27 mmol) of p-toluenesulfonic acid monohydrate were added to and reacted with this solution at 80° C. for 1 hour. Thereafter, the reaction solution was cooled to room temperature, and 48 ml of acetic acid and 85.34 g (752.7 mmol) of a 30% hydrogen peroxide solution were added and reacted at 80° C. for another 2 hours. The reaction solution was cooled to room temperature, and 630 ml of methanol was added. The precipitated crystals were filtered, and were rinsed with 320 ml of methanol to give 85.7 g of the antioxidant represented by Formula (A) as a

TABLE 1

| | Production Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Acrylic rubber | (α-1) | (α-2) | (α-3) | (α-4) | (α-5) | (α-6) | (α-7) | (α-8) | (α-9) | (α-10) | (α-11) | (α-12) | (α-13) | (α-14) |
| | Composition (wt %) of acrylic rubber | | | | | | | | | | | | | |
| Ethyl acrylate unit | — | 36 | 12 | 17 | — | 48.5 | 16.5 | 58 | 30 | — | 30 | — | 10 | 5 |
| n-Butyl acrylate unit | 74.5 | 45 | 64.5 | 55.5 | 64.5 | 32 | 44 | 40.5 | 56.5 | 58.5 | 39.5 | 47.5 | 45.5 | 34.5 |
| 2-Methoxyethyl acrylate unit | — | — | — | — | — | — | — | — | 10 | 6 | — | — | — | — |
| Methyl methacrylate unit | 24 | — | — | — | — | — | — | — | — | — | — | — | — | — |
| Ethyl methacrylate unit | — | 17.5 | 22 | 26 | 34 | — | — | — | — | 34 | — | — | 18 | — |
| n-Butyl methacrylate unit | — | — | — | — | — | 18 | 38 | — | — | — | 29 | 51 | — | 59 |
| n-Hexyl methacrylate unit | — | — | — | — | — | — | — | — | — | — | — | — | 25 | — |
| Monobutyl maleate unit | 1.5 | 1.5 | 1.5 | 1.5 | 1.5 | 1.5 | 1.5 | 1.5 | 1.5 | 1.5 | 1.5 | 1.5 | 1.5 | 1.5 | white crystalline compound with a yield of 73%. The structure was identified by ¹H-NMR. ¹H-NMR (500 MHz, DMSO-d6, TMS, δ ppm): 1.67 (s, 12H), 7.15-7.32 (m, 12H), 7.43 (dd, 2H, J=9.0, 2.0 Hz), 7.68 (d, 2H, J=1.5 Hz), 10.84 (s, 1H).

Production Example 16: Antioxidant Represented by Formula (B)

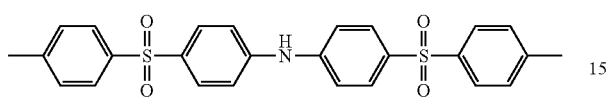
(B)

Step 1: Synthesis of Intermediate Represented by Formula (B-1)

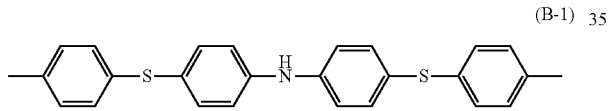
(B-1)

In a two-necked reactor, 15.00 g (35.63 mmol) of bis(4-iodophenyl)amine and 9.29 g (74.82 mmol) of p-toluenethiol were dissolved in 300 ml of toluene in a nitrogen stream. 17.12 g (178.1 mmol) of sodium tert-butoxide and 0.73 g (0.89 mmol) of a [1,1'-bis(diphenylphosphino) ferrocene]-palladium(II) dichloride dichloromethane adduct were added to and reacted with this solution at 80° C. for 4 hours. Subsequently, the reaction solution was cooled to room temperature, and 1000 ml of distilled water and 500 ml of saturated saline water were added, followed by extraction with 500 ml of ethyl acetate. The organic layer was dried over sodium sulfate, was condensed with a rotary evaporator, and was refined by silica gel column chromatography (hexane:tetrahydrofuran=4:1) to give 8.84 g of an intermediate represented by Formula (B-1) with a yield of 60%. The structure was identified by ¹H-NMR. ¹H-NMR (500 MHz, CDCl₃, TMS, δ ppm): δ 2.31 (s, 6H), 5.78 (s, 1H), 7.00 (d, 4H, J=8.5 Hz), 7.08 (d, 4H, J=8.0 Hz), 7.18 (d, 4H, J=8.0 Hz), 7.30 (d, 4H, J=8.5 Hz).

Step 2: Synthesis of Antioxidant Represented by Formula (B)

8.00 g (19.34 mmol) of the intermediate represented by Formula (B-1) was placed into a two-necked reactor, and was dissolved in 50 ml of THF. 150 ml of acetic acid and 11.08 g (96.71 mmol) of a 30% hydrogen peroxide solution were added to and reacted with this solution at 80° C. for 2 hours. Subsequently, the reaction solution was cooled to room temperature, and 500 ml of distilled water and 500 ml of saturated saline water were added, followed by extraction with 500 ml of ethyl acetate. The organic layer was dried over sodium sulfate, was condensed with a rotary evaporator, and was refined by silica gel column chromatography (hexane:tetrahydrofuran=1:1) to give 8.35 g of an antioxidant represented by Formula (B) having a melting point of 225° C. with a yield of 90%. The structure was identified by ¹H-NMR. ¹H-NMR (500 MHz, DMSO-d6, TMS, δ ppm): δ 2.36 (s, 6H), 7.26 (d, 4H, J=9.0 Hz), 7.40 (d, 4H, J=8.0 Hz), 7.78-7.80 (m, 8H), 9.44 (s, 1H).

Production Example 17: Antioxidant Represented by Formula (C)

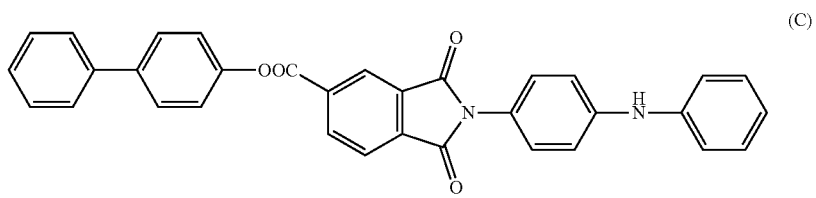
(C)

Step 1: Synthesis of Intermediate Represented by Formula (C-1)

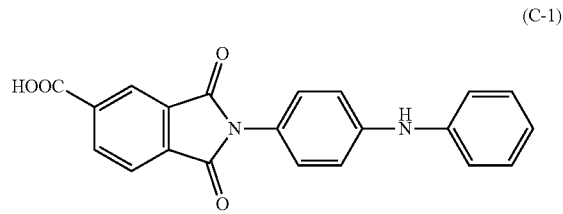 [SMILES: O=C(O)c1ccc2c(c1)C(=O)N(c1ccc(Nc3ccccc3)cc1)C2=O]
(C-1)

In a four-necked reactor provided with a cooler and a thermometer, 80 g (0.42 mol) of trimellitic anhydride and 76.7 g (0.42 mol) of 4-aminodiphenylamine were dissolved in 1 liter of acetic acid in a nitrogen stream. This solution was reacted in an oil bath for 10 hours with heating under reflux. After the reaction was completed, the reaction solution was added to 2 liters of water to precipitate solids. Subsequently, the precipitated solids were subjected to suction filtration. The residue was washed with water and then methanol, and was dried with a vacuum dryer to give 138.5 g of an intermediate represented by Formula (C-1) as a yellow green solid (yield: 92%). The structure was identified by ¹H-NMR. ¹H-NMR (500 MHz, THF-d8, TMS, δ ppm): 6.97 (t, 1H, J=7.0 Hz), 7.24-7.28 (m, 4H), 7.33-7.36 (m, 2H), 7.40-7.42 (m, 2H), 7.68 (s, 1H), 8.11 (d, 1H, J=8.5 Hz), 8.56-8.58 (m, 2H), 12.20 (bs, 1H).

Step 2: Synthesis of Antioxidant Represented by Formula (C)

In a four-necked reactor provided with a cooler, a thermometer, and a dropping funnel, 10 g (0.028 mol) of the intermediate represented by Formula (C-1), 5.7 g (0.033 mol) of 4-hydroxybiphenyl, and 400 mg (0.0033 mol) of N,N-dimethyl-4-aminopyridine were dissolved in 150 ml of N-methylpyrrolidone in a nitrogen stream. Under room temperature, 6.4 g (0.033 mol) of 1-ethyl-3-(3-dimethylaminopropyl) carbodiimide hydrochloride (WSC) was added to this solution. Subsequently, the compounds were reacted under room temperature for 14 hours. After the reaction was completed, the reaction solution was added to water to precipitate solids. The precipitated solids were subjected to suction filtration. The resulting solids were again dissolved in 100 ml of N-methylpyrrolidone, and the solution was gradually added to 1 liter of methanol to precipitate solids. The precipitated solids were subjected to suction filtration, and the residue was washed with methanol. Furthermore, the resulting solids were again dissolved in 100 ml of N-methylpyrrolidone, and the solution was gradually added to 1 liter of methanol to precipitate solids. The precipitated solids were subjected to suction filtration, and the residue was washed with methanol. The obtained residue was dried with a vacuum dryer to give 12.1 g of the antioxidant represented by Formula (C) as a yellow solid (yield: 85%). The structure was identified by $^1$H-NMR. $^1$H-NMR (500 MHz, DMF-d7, TMS, δ ppm): 6.92 (t, 1H, J=7.5 Hz), 7.25 (d, 2H, J=7.5 Hz), 7.29-7.33 (m, 4H), 7.41-7.44 (m, 3H), 7.52 (t, 2H, J=8.0 Hz), 7.57 (d, 2H, J=9.0 Hz), 7.77 (dd, 2H, J=1.0 Hz, 8.5 Hz), 7.87 (d, 2H, J=11.5 Hz), 8.22 (d, 1H, J=13.5 Hz), 8.49 (s, 1H), 8.58-8.59 (m, 1H), 8.71 (dd, 1H, J=1.5 Hz, 7.5 Hz).

Production Example 18: Antioxidant Represented by Formula (D)

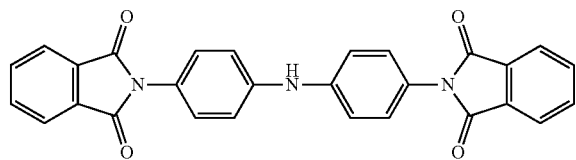

(D)

15.00 g of 4,4'-diaminodiphenylamine sulfate hydrate, 16.46 g phthalic anhydride, 140 cc of acetic acid, and 70 cc of N-methylpyrrolidinone were placed into a 500-cc four-necked flask provided with a reflux cooler, followed by heating at 125° C. for 2.5 hours. After the heating was completed, the reaction solution was cooled to room temperature, 140 cc of methanol was added, and the precipitate was filtered out. The obtained precipitate was washed with 120 cc of methanol, was suspended in 140 cc of N-methylpyrrolidinone, and was dissolved by heating to 100° C. After this solution was cooled to room temperature, 280 cc of methanol was added, and the precipitate was filtered out. The obtained precipitate was washed with 130 cc of methanol, and was dried under reduced pressure to give 18.53 g of the antioxidant represented by Formula (D) with a yield of 80%. The structure was identified by $^1$H-NMR. $^1$H-NMR (500 MHz, DMSO-d6, TMS, δ ppm): δ 7.25 (dd, J=2.0, 6.5 Hz, 4H), 7.31 (dd, J=2.0, 6.5 Hz, 4H), 7.90 (dd, J=3.0, 5.5 Hz, 4H), 7.96 (dd, J=3.0, 5.5 Hz, 4H), 8.65 (s, 1H).

Example 1

60 parts of FEF carbon black (trade name "SEAST SO", available from Tokai Carbon Co., Ltd., filler, "SEAST" is a registered trademark), 1 part of stearic acid (trade name "Stearic acid Sakura", available from NOF CORPORATION, lubricant), 1 part of an ester wax (trade name "Gregg G-8205", available from DIC Corporation, lubricant), and 1.5 parts of the antioxidant represented by Formula (A), which was prepared in Production Example 15, were added to 100 parts of the acrylic rubber (α-1) prepared in Production Example 1, and these were mixed at 50° C. for 5 minutes using a Banbury mixer. In the next step, the mixture was transferred to a roll at 50° C., and 1 part of 2,2-bis[4-(4-aminophenoxy)phenyl]propane (trade name "BAPP", available from Wakayama Seika Kogyo Co., Ltd., cross-linking agent) and 2 parts of 1,3-di-o-tolylguanidine (trade name "NOCCELER DT", available from Ouchi Shinko Chemical Industrial Co., Ltd., cross-linking accelerator, "NOCCELER" is a registered trademark) were compounded and kneaded with the mixture to prepare an acrylic rubber composition. The resulting acrylic rubber composition was measured for the Mooney viscosity (ML1+4, 100° C.) by the method described above. Using the acrylic rubber composition, test pieces of its cross-linked rubber were prepared by the method described above to evaluate normal state physical properties (tensile strength, elongation, and hardness) and the results from the heat aging resistance test and the cold resistance test. The results are shown in Table 2.

Comparative Example 1

An acrylic rubber composition was prepared in the same manner as in Example 1 except that 2 parts of 4,4'-bis(α,α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Example 1. The results are shown in Table 2.

Example 2

An acrylic rubber composition was prepared in the same manner as in Example 1 except that the acrylic rubber (α-2) prepared in Production Example 2 was used instead of the acrylic rubber (α-1), and was evaluated in the same manner as in Example 1. The results are shown in Table 2.

Comparative Example 2

An acrylic rubber composition was prepared in the same manner as in Example 2 except that 2 parts of 4,4'-bis((α,α-dimethylbenzyl)diphenylamine (trade name "NOCPAC CD", available from Ouchi Shinko Chemical Industrial Co., Ltd., antioxidant, "NOCRAC" is a registered trademark) was used instead of 1.5 parts of the antioxidant represented by Formula (A), which was prepared in Production Example 15, and was evaluated in the same manner as in Example 2. The results are shown in Table 2.

Example 3

An acrylic rubber composition was prepared in the same manner as in Example 1 except that the acrylic rubber (α-3) prepared in Production Example 3 was used instead of the acrylic rubber (α-1), and was evaluated in the same manner as in Example 1. The results are shown in Table 2.

Comparative Example 3

An acrylic rubber composition was prepared in the same manner as in Example 3 except that 2 parts of 4,4'-bis((α, α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Example 3. The results are shown in Table 2.

Example 4

An acrylic rubber composition was prepared in the same manner as in Example 1 except that the acrylic rubber (α-4) prepared in Production Example 4 was used instead of the acrylic rubber (α-1), and was evaluated in the same manner as in Example 1. The results are shown in Table 2.

Comparative Example 4

An acrylic rubber composition was prepared in the same manner as in Example 4 except that 2 parts of 4,4'-bis((α, α-dimethylbenzyl)diphenylamine (trade name "NOCPAC CD", available from Ouchi Shinko Chemical Industrial Co., Ltd., antioxidant, "NOCRAC" is a registered trademark) was used instead of 1.5 parts of the antioxidant represented by Formula (A), which was prepared in Production Example 15, and was evaluated in the same manner as in Example 4. The results are shown in Table 2.

Example 5

An acrylic rubber composition was prepared in the same manner as in Example 1 except that the acrylic rubber (α-5) prepared in Production Example 5 was used instead of the acrylic rubber (α-1), and the antioxidant represented by Formula (A), which was prepared in Production Example 15, was used in an amount of 0.5 parts, and was evaluated in the same manner as in Example 1. The results are shown in Table 2.

Examples 6 and 7

Acrylic rubber compositions were prepared in the same manner as in Example 5 except that the antioxidant represented by Formula (A), which was prepared in Production Example 15, was used in an amount of 1.5 parts (Example 6) and 2.5 parts (Example 7), respectively, and were evaluated in the same manner as in Example 5. The results are shown in Table 2.

Example 8

An acrylic rubber composition was prepared in the same manner as in Example 5 except that 2.5 parts of the antioxidant represented by Formula (B), which was prepared in Production Example 16, was used instead of the antioxidant represented by Formula (A), which was prepared in Production Example 15, and was evaluated in the same manner as in Example 5. The results are shown in Table 2.

Example 9

An acrylic rubber composition was prepared in the same manner as in Example 5 except that 2.5 parts of the antioxidant represented by Formula (C), which was prepared in Production Example 17, was used instead of the antioxidant represented by Formula (A), which was prepared in Production Example 15, and was evaluated in the same manner as in Example 5. The results are shown in Table 2.

Example 10

An acrylic rubber composition was prepared in the same manner as in Example 5 except that 2.5 parts of the antioxidant represented by Formula (D), which was prepared in Production Example 18, was used instead of the antioxidant represented by Formula (A), which was prepared in Production Example 15, and was evaluated in the same manner as in Example 5. The results are shown in Table 2.

Comparative Example 5

An acrylic rubber composition was prepared in the same manner as in Example 5 except that 2 parts of 4,4'-bis(α, α-dimethylbenzyl)diphenylamine (trade name "NOCPAC CD", available from Ouchi Shinko Chemical Industrial Co., Ltd., antioxidant, "NOCPAC" is a registered trademark) was used instead of 0.5 parts of the antioxidant represented by Formula (A), which was prepared in Production Example 15, and was evaluated in the same manner as in Example 5. The results are shown in Table 2.

Example 11

An acrylic rubber composition was prepared in the same manner as in Example 1 except that the acrylic rubber (α-6) prepared in Production Example 6 was used instead of the acrylic rubber (α-1), and was evaluated in the same manner as in Example 1. The results are shown in Table 2.

Comparative Example 6

An acrylic rubber composition was prepared in the same manner as in Example 11 except that 2 parts of 4,4'-bis(α, α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Example 11. The results are shown in Table 2.

Example 12

An acrylic rubber composition was prepared in the same manner as in Example 1 except that the acrylic rubber (α-7) prepared in Production Example 7 was used instead of the acrylic rubber (α-1), and was evaluated in the same manner as in Example 1. The results are shown in Table 2.

Comparative Example 7

An acrylic rubber composition was prepared in the same manner as in Example 12 except that 2 parts of 4,4'-bis(α, α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Example 12. The results are shown in Table 2.

Comparative Example 8

An acrylic rubber composition was prepared in the same manner as in Example 1 except that the acrylic rubber (α-8)

prepared in Production Example 8 was used instead of the acrylic rubber (α-1), and was evaluated in the same manner as in Example 1. The results are shown in Table 3.

Comparative Example 9

An acrylic rubber composition was prepared in the same manner as in Comparative Example 8 except that 2 parts of 4,4'-bis(α,α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Comparative Example 8. The results are shown in Table 3.

Comparative Example 10

An acrylic rubber composition was prepared in the same manner as in Example 1 except that the acrylic rubber (α-9) prepared in Production Example 9 was used instead of the acrylic rubber (α-1), and was evaluated in the same manner as in Example 1. The results are shown in Table 3.

Comparative Example 11

An acrylic rubber composition was prepared in the same manner as in Comparative Example 10 except that 2 parts of 4,4'-bis(α,α-dimethylbenzyl)diphenylamine (trade name "NOCPAC CD", available from Ouchi Shinko Chemical Industrial Co., Ltd., antioxidant, "NOCPAC" is a registered trademark) was used instead of 1.5 parts of the antioxidant represented by Formula (A), which was prepared in Production Example 15, and was evaluated in the same manner as in Comparative Example 10. The results are shown in Table 3.

Examples 13 to 16

Acrylic rubber compositions were prepared in the same manner as in Example 1 except that the acrylic rubbers (α-10) to (α-13) prepared in Production Examples 10 to 13 were used instead of the acrylic rubber (α-1), and were evaluated in the same manner as in Example 1. The results are shown in Table 3.

Comparative Example 12

An acrylic rubber composition was prepared in the same manner as in Example 1 except that the acrylic rubber (α-14) prepared in Production Example 14 was used instead of the acrylic rubber (α-1), and was evaluated in the same manner as in Example 1. The results are shown in Table 3.

TABLE 2

|  | Example 1 | Comp. Example 1 | Example 2 | Comp. Example 2 | Example 3 | Comp. Example 3 | Example 4 | Comp. Example 4 |
|---|---|---|---|---|---|---|---|---|
|  |  |  |  | Acrylic rubber |  |  |  |  |
|  | (α-1) | (α-1) | (α-2) | (α-2) | (α-3) | (α-3) | (α-4) | (α-4) |
| Composition (wt %) of acrylic rubber |  |  |  |  |  |  |  |  |
| Ethyl acrylate unit | — | — | 36 | 36 | 12 | 12 | 17 | 17 |
| n-Butyl acrylate unit | 74.5 | 74.5 | 45 | 45 | 64.5 | 64.5 | 55.5 | 55.5 |
| 2-Methoxyethyl acrylate unit | — | — | — | — | — | — | — | — |
| Methyl methacrylate unit | 24 | 24 | — | — | — | — | — | — |
| Ethyl methacrylate unit | — | — | 17.5 | 17.5 | 22 | 22 | 26 | 26 |
| n-Butyl methacrylate unit | — | — | — | — | — | — | — | — |
| n-Hexyl methacrylate unit | — | — | — | — | — | — | — | — |
| Monobutyl maleate unit | 1.5 | 1.5 | 1.5 | 1.5 | 1.5 | 1.5 | 1.5 | 1.5 |

|  | Example 5 | Example 6 | Example 7 | Example 8 | Example 9 | Example 10 | Comp. Example 5 |
|---|---|---|---|---|---|---|---|
|  |  |  |  | Acrylic rubber |  |  |  |
|  | (α-5) | (α-5) | (α-5) | (α-5) | (α-5) | (α-5) | (α-5) |
| Composition (wt %) of acrylic rubber |  |  |  |  |  |  |  |
| Ethyl acrylate unit | — | — | — | — | — | — | — |
| n-Butyl acrylate unit | 64.5 | 64.5 | 64.5 | 64.5 | 64.5 | 64.5 | 64.5 |
| 2-Methoxyethyl acrylate unit | — | — | — | — | — | — | — |
| Methyl methacrylate unit | — | — | — | — | — | — | — |
| Ethyl methacrylate unit | 34 | 34 | 34 | 34 | 34 | 34 | 34 |
| n-Butyl methacrylate unit | — | — | — | — | — | — | — |
| n-Hexyl methacrylate unit | — | — | — | — | — | — | — |
| Monobutyl maleate unit | 1.5 | 1.5 | 1.5 | 1.5 | 1.5 | 1.5 | 1.5 |

TABLE 2-continued

|  | Example 11 | Comp. Example 6 | Example 12 | Comp. Example 7 |
|---|---|---|---|---|
|  | Acrylic rubber | | | |
|  | (α-6) | (α-6) | (α-7) | (α-7) |
| Composition (wt %) of acrylic rubber | | | | |
| Ethyl acrylate unit | 48.5 | 48.5 | 16.5 | 16.5 |
| n-Butyl acrylate unit | 32 | 32 | 44 | 44 |
| 2-Methoxyethyl acrylate unit | — | — | — | — |
| Methyl methacrylate unit | — | — | — | — |
| Ethyl methacrylate unit | — | — | — | — |
| n-Butyl methacrylate unit | 18 | 18 | 38 | 38 |
| n-Hexyl methacrylate unit | — | — | — | — |
| Monobutyl maleate unit | 1.5 | 1.5 | 1.5 | 1.5 |

|  | Example 1 | Example Comp. 1 | Example 2 | Comp. Example 2 | Example 3 | Comp. Example 3 | Example 4 | Comp. Example 4 |
|---|---|---|---|---|---|---|---|---|
| Composition (parts) of acrylic rubber composition | | | | | | | | |
| Acrylic rubber | 100 | 100 | 100 | 100 | 100 | 100 | 100 | 100 |
| FEF carbon black (filler) | 60 | 60 | 60 | 60 | 60 | 60 | 60 | 60 |
| Stearic acid (lubricant) | 1 | 1 | 1 | 1 | 1 | 1 | 1 | 1 |
| Ester wax (lubricant) | 1 | 1 | 1 | 1 | 1 | 1 | 1 | 1 |
| 4,4'-Bis(a,a-dimethylbenzyl)diphenylamine (antioxidant) | — | 2 | — | 2 | — | 2 | — | 2 |
| Antioxidant represented by Formula (A) | 1.5 | — | 1.5 | — | 1.5 | — | 1.5 | — |
| Antioxidant represented by Formula (B) | — | — | — | — | — | — | — | — |
| Antioxidant represented by Formula (C) | — | — | — | — | — | — | — | — |
| Antioxidant represented by Formula (D) | — | — | — | — | — | — | — | — |
| BAPP (cross-linking agent) | 1 | 1 | 1 | 1 | 1 | 1 | 1 | 1 |
| 1,3-Di-o-tolylguanidine (cross-linking accelerator) | 2 | 2 | 2 | 2 | 2 | 2 | 2 | 2 |

|  | Example 5 | Example 6 | Example 7 | Example 8 | Example 9 | Example 10 | Comp. Example 5 |
|---|---|---|---|---|---|---|---|
| Composition (parts) of acrylic rubber composition | | | | | | | |
| Acrylic rubber | 100 | 100 | 100 | 100 | 100 | 100 | 100 |
| FEF carbon black (filler) | 60 | 60 | 60 | 60 | 60 | 60 | 60 |
| Stearic acid (lubricant) | 1 | 1 | 1 | 1 | 1 | 1 | 1 |
| Ester wax (lubricant) | 1 | 1 | 1 | 1 | 1 | 1 | 1 |
| 4,4'-Bis(a,a-dimethylbenzyl)diphenylamine (antioxidant) | — | — | — | — | — | — | 2 |
| Antioxidant represented by Formula (A) | 0.5 | 1.5 | 2.5 | — | — | — | — |
| Antioxidant represented by Formula (B) | — | — | — | 2.5 | — | — | — |
| Antioxidant represented by Formula (C) | — | — | — | — | 2.5 | — | — |
| Antioxidant represented by Formula (D) | — | — | — | — | — | 2.5 | — |
| BAPP (cross-linking agent) | 1 | 1 | 1 | 1 | 1 | 1 | 1 |
| 1,3-Di-o-tolylguanidine (cross-linking accelerator) | 2 | 2 | 2 | 2 | 2 | 2 | 2 |

|  | Example 11 | Comp. Example 6 | Example 12 | Comp. Example 7 |
|---|---|---|---|---|
| Composition (parts) of acrylic rubber composition | | | | |
| Acrylic rubber | 100 | 100 | 100 | 100 |
| FEF carbon black (filler) | 60 | 60 | 60 | 60 |
| Stearic acid (lubricant) | 1 | 1 | 1 | 1 |
| Ester wax (lubricant) | 1 | 1 | 1 | 1 |
| 4,4'-Bis(a,a-dimethylbenzyl)diphenylamine (antioxidant) | — | 2 | — | 2 |
| Antioxidant represented by Formula (A) | 1.5 | — | 1.5 | — |

TABLE 2-continued

| | | | | |
|---|---|---|---|---|
| Antioxidant represented by Formula (B) | — | — | — | — |
| Antioxidant represented by Formula (C) | — | — | — | — |
| Antioxidant represented by Formula (D) | — | — | — | — |
| BAPP (cross-linking agent) | 1 | 1 | 1 | 1 |
| 1,3-Di-o-tolylguanidine (cross-linking accelerator) | 2 | 2 | 2 | 2 |

| | Example 1 | Example Comp. 1 | Example 2 | Comp. Example 2 | Example 3 | Comp. Example 3 | Example 4 | Comp. Example 4 |
|---|---|---|---|---|---|---|---|---|
| Compound Mooney viscosity (100° C.) | | | | | | | | |
| ML1+4 | 70 | 70 | 61 | 58 | 58 | 58 | 60 | 60 |
| Normal state physical properties | | | | | | | | |
| Tensile strength (MPa) | 11.5 | 11.6 | 10.8 | 10.6 | 10.7 | 10.7 | 10.7 | 10.6 |
| Elongation (%) | 240 | 240 | 250 | 240 | 270 | 270 | 260 | 260 |
| Hardness (DuroA) | 77 | 77 | 69 | 67 | 66 | 66 | 67 | 67 |
| Heat aging resistance test (200° C. × 336 h) | | | | | | | | |
| Retained elongation (%) | 150 | 100 | 110 | 60 | 140 | 100 | 150 | 110 |
| Elongation change (%) | −38 | −58 | −56 | −75 | −48 | −63 | −42 | −58 |
| Cold resistance test (TR test) | | | | | | | | |
| TR10 (° C.) | −17 | −17 | −22 | −22 | −24 | −24 | −20 | −20 |

| Example | Example 5 | Example 6 | Example 7 | Example 8 | Example 9 | Example 10 | Comp. Example 5 |
|---|---|---|---|---|---|---|---|
| Compound Mooney viscosity (100° C.) | | | | | | | |
| ML1+4 | 59 | 58 | 62 | 60 | 61 | 61 | 59 |
| Normal state physical properties | | | | | | | |
| Tensile strength (MPa) | 10.2 | 10,4 | 10.4 | 10.1 | 9.9 | 10.5 | 10.2 |
| Elongation (%) | 310 | 300 | 290 | 290 | 300 | 280 | 310 |
| Hardness (DuroA) | 69 | 70 | 71 | 70 | 70 | 72 | 70 |
| Heat aging resistance test (200° C. × 336 h) | | | | | | | |
| Retained elongation (%) | 180 | 210 | 210 | 170 | 170 | 200 | 130 |
| Elongation change (%) | −42 | −30 | −28 | −41 | −43 | −29 | −58 |
| Cold resistance test (TR test) | | | | | | | |
| TR10 (° C.) | −18 | −18 | −18 | −18 | −18 | −18 | −18 |

| | Example 11 | Comp. Example 6 | Example 12 | Comp. Example 7 |
|---|---|---|---|---|
| Compound Mooney viscosity (100° C.) | | | | |
| ML1+4 | 55 | 54 | 47 | 46 |
| Normal state physical properties | | | | |
| Tensile strength (MPa) | 9.9 | 9.8 | 9.5 | 9.3 |
| Elongation (%) | 210 | 220 | 270 | 260 |
| Hardness (DuroA) | 66 | 66 | 69 | 68 |
| Heat aging resistance test (200° C. × 336 h) | | | | |
| Retained elongation (%) | 100 | 60 | 170 | 110 |
| Elongation change (%) | −52 | −73 | −37 | −58 |
| Cold resistance test (TR test) | | | | |
| TR10 (° C.) | −21 | −21 | −19 | −19 |

TABLE 3

|  | Comp. Example 8 | Comp. Example 9 | Comp. Example 10 | Comp. Example 11 |
|---|---|---|---|---|
|  | Acrylic rubber | | | |
|  | (α-8) | (α-8) | (α-9) | (α-9) |
| Composition (wt %) of acrylic rubber | | | | |
| Ethyl acrylate unit | 58 | 58 | 30 | 30 |
| n-Butyl acrylate unit | 40.5 | 40.5 | 58.5 | 58.5 |
| 2-Methoxyethyl acrylate unit | — | — | 10 | 10 |
| Methyl methacrylate unit | — | — | — | — |
| Ethyl methacrylate unit | — | — | — | — |
| n-Butyl methacrylate unit | — | — | — | — |
| n-Hexyl methacrylate unit | — | — | — | — |
| Monobutyl maleate unit | 1.5 | 1.5 | 1.5 | 1.5 |

|  | Example 13 | Example 14 | Example 15 | Example 16 | Example 12 |
|---|---|---|---|---|---|
|  | Acrylic rubber | | | | |
|  | (α-10) | (α-11) | (α-12) | (α-13) | (α-14) |
| Composition (wt %) of acrylic rubber | | | | | |
| Ethyl acrylate unit | — | 30 | — | 10 | 5 |
| n-Butyl acrylate unit | 58.5 | 39.5 | 47.5 | 45.5 | 34.5 |
| 2-Methoxyethyl acrylate unit | 6 | — | — | — | — |
| Methyl methacrylate unit | — | — | — | — | — |
| Ethyl methacrylate unit | 34 | — | — | 18 | — |
| n-Butyl methacrylate unit | — | 29 | 51 | — | 59 |
| n-Hexyl methacrylate unit | — | — | — | 25 | — |
| Monobutyl maleate unit | 1.5 | 1.5 | 1.5 | 1.5 | 1.5 |

|  | Comp. Example 8 | Comp. Example 9 | Comp. Example 10 | Comp. Example 11 |
|---|---|---|---|---|
| Composition (parts) of acrylic rubber composition | | | | |
| Acrylic rubber | 100 | 100 | 100 | 100 |
| FEF carbon black (filler) | 60 | 60 | 60 | 60 |
| Stearic acid (lubricant) | 1 | 1 | 1 | 1 |
| Ester wax (lubricant) | 1 | 1 | 1 | 1 |
| 4,4'-Bis(a,a-dimethylbenzyl)diphenyl-amine (antioxidant) | — | 2 | — | 2 |
| Antioxidant represented by Formula (A) | 1.5 | — | 1.5 | — |
| Antioxidant represented by Formula (B) | — | — | — | — |
| Antioxidant represented by Formula (C) | — | — | — | — |
| Antioxidant represented by Formula (D) | — | — | — | — |
| BAPP (cross-linking agent) | 1 | 1 | 1 | 1 |
| 1,3-Di-o-tolylguanidine (cross-linking accelerator) | 2 | 2 | 2 | 2 |

|  | Example 13 | Example 14 | Example 15 | Example 16 | Comp. Example 12 |
|---|---|---|---|---|---|
| Composition (parts) of acrylic rubber composition | | | | | |
| Acrylic rubber | 100 | 100 | 100 | 100 | 100 |
| FEF carbon black (filler) | 60 | 60 | 60 | 60 | 60 |
| Stearic acid (lubricant) | 1 | 1 | 1 | 1 | 1 |
| Ester wax (lubricant) | 1 | 1 | 1 | 1 | 1 |
| 4,4'-Bis(a,a-dimethylbenzyl)diphenyl-amine (antioxidant) | — | — | — | — | — |
| Antioxidant represented by Formula (A) | 1.5 | 1.5 | 1.5 | 1.5 | 1.5 |
| Antioxidant represented by Formula (B) | — | — | — | — | — |
| Antioxidant represented by Formula (C) | — | — | — | — | — |
| Antioxidant represented by Formula (D) | — | — | — | — | — |
| BAPP (cross-linking agent) | 1 | 1 | 1 | 1 | 1 |
| 1,3-Di-o-tolylguanidine (cross-linking accelerator) | 2 | 2 | 2 | 2 | 2 |

TABLE 3-continued

|  | Comp. Example 8 | Comp. Example 9 | Comp. Example 10 | Comp. Example 11 |
|---|---|---|---|---|
| Compound Mooney viscosity (100° C.) | | | | |
| ML1+4 | 60 | 58 | 70 | 68 |
| Normal state physical properties | | | | |
| Tensile strength (MPa) | 9.8 | 10 | 11 | 11.1 |
| Elongation (%) | 240 | 250 | 240 | 250 |
| Hardness (DuroA) | 65 | 65 | 66 | 65 |
| Heat aging resistance test (200° C. × 336 h) | | | | |
| Retained elongation (%) | 60 | 40 | 70 | 50 |
| Elongation change (%) | −75 | −84 | −71 | −80 |
| Cold resistance test (TR test) | | | | |
| TR10 (° C.) | −26 | −26 | −23 | −23 |

|  | Example 13 | Example 14 | Example 15 | Example 16 | Comp. Example 12 |
|---|---|---|---|---|---|
| Compound Mooney viscosity (100° C.) | | | | | |
| ML1+4 | 60 | 56 | 46 | 52 | 49 |
| Normal state physical properties | | | | | |
| Tensile strength (MPa) | 10.4 | 9.8 | 10 | 9.2 | 9.5 |
| Elongation (%) | 290 | 240 | 300 | 310 | 330 |
| Hardness (DuroA) | 72 | 67 | 75 | 68 | 74 |
| Heat aging resistance test (200° C. × 336 h) | | | | | |
| Retained elongation (%) | 150 | 160 | 210 | 160 | 170 |
| Elongation change (%) | −48 | −33 | −30 | −48 | −48 |
| Cold resistance test (TR test) | | | | | |
| TR10 (° C.) | −17 | −20 | −15 | −21 | −8 |

Table 2 and 3 show that using the acrylic rubber compositional each comprising the acrylic rubber and the antioxidant wherein the acrylic rubber comprises 15 to 55% by weight of the methacrylic acid alkyl ester monomer units (a), 44.5 to 84.5% by weight of the acrylic acid ester monomer units (b), and 0.5 to 4% by weight of the carboxyl group-containing monomer units (c), the antioxidant is at least one of compounds represented by General Formulae (1) to (4), and the content of the antioxidant is 0.1 to 5 parts by weight relative to 100 parts by weight of the acrylic rubber, cross-linked rubbers could be prepared which demonstrated high cold resistance and had significantly improved heat resistance (Examples 1 to 16).

In particular, as shown in Table 2, comparison between Example 1 and Comparative Example 1 verified that use of the acrylic rubber having the above specific monomer composition in combination with any of the compounds represented by General Formulae (1) to (4) as the antioxidant can dramatically enhance the heat resistance improving effect attributed to use of such a compound. This can also be verified from comparisons between Example 2 and Comparative Example 2, between Example 3 and Comparative Example 3, between Example 4 and Comparative Example 4, between Examples 5 to 10 and Comparative Example 5, between Example 11 and Comparative Example 6, and between Example 12 and Comparative Example 7.

In contrast, as shown in Table 3, comparisons between Comparative Example 8 and Comparative Example 9 and between Comparative Example 10 and Comparative Example 11 verified that even if used in combination with any of the compounds represented by General Formulae (1) to (4) as the antioxidant, the acrylic rubbers having monomer proportions out of the ranges specified in the present invention reduced the heat resistance improving effect, and the resulting cross-linked rubbers also had reduced heat resistance.

Table 3 also shows that in Comparative Example 12 where the acrylic rubber containing a significantly large amount of the methacrylic acid alkyl ester monomer units, the resulting cross-linked rubber had heat resistance improved to some extent but had reduced cold resistance.

The invention claimed is:

1. An acrylic rubber composition comprising an acrylic rubber and an antioxidant,
    wherein the acrylic rubber comprises:
        17.5 to 43% by weight of methacrylic acid alkyl ester monomer units (a);
        55.5 to 81% by weight of acrylic acid ester monomer units (b); and
        1 to 2% by weight of carboxyl group-containing monomer units (c),
    the antioxidant is a compound represented by General Formula (9),
    the methacrylic acid alkyl ester monomer units (a) are at least one selected from the group consisting of methyl methacrylate units, ethyl methacrylate units, n-butyl methacrylate units, and n-hexyl methacrylate units,
    the acrylic acid ester monomer units (b) are at least one selected from the group consisting of ethyl acrylate units, and n-butyl acrylate units,
    the carboxyl group-containing monomer units (c) are monoesters of $C_4$ to $C_{12}$ α,β-, and the content of the antioxidant is 0.5 to 2.5 parts by weight relative to 100 parts by weight of the acrylic rubber:

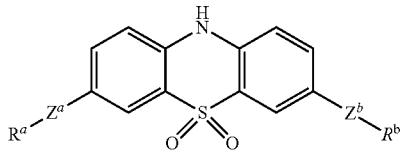
(9)

where, in General Formula (9), $R^a$ and $R^b$ each independently represent an α-methylbenzyl group, an α,α-dimethylbenzyl group, a phenyl group, or a 4-methylphenyl group; and $Z^a$ and $Z^b$ each independently represent a chemical single bond.

2. The acrylic rubber composition according to claim 1, further comprising 0.05 to 20 parts by weight of a cross-linking agent relative to 100 parts by weight of the acrylic rubber.

3. A cross-linked rubber prepared by cross-linking the acrylic rubber composition according to claim 2.

4. The cross-linked rubber according to claim 3, wherein the cross-linked rubber is a hose material or a sealing material.

5. The acrylic rubber composition according to claim 2, wherein the cross-linking agent is an aromatic polyvalent amine compound.

6. The acrylic rubber composition according to claim 1, wherein the compound represented by General Formula (9) is a compound represented by General Formula (A):

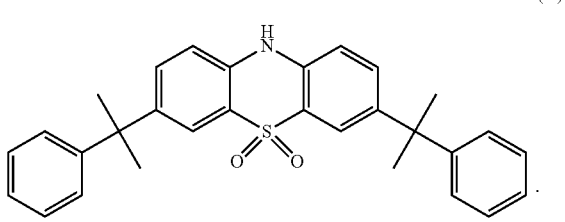
(A)

7. The acrylic rubber composition according to claim 1, wherein the methacrylic acid alkyl ester monomer units (a) are at least one selected from the group consisting of methyl methacrylate units, ethyl methacrylate units, and n-butyl methacrylate units.

* * * * *